(12) United States Patent
Hosoi et al.

(10) Patent No.: US 6,266,135 B1
(45) Date of Patent: Jul. 24, 2001

(54) PRINTER USING PRINTING SHEET TO WHICH PHOTOSENSITIVE MICROCAPSULE IS APPLIED AND PRINTING SYSTEM USING PRINTER

(75) Inventors: Yuji Hosoi; Syoji Tozaki; Masayuki Yamada; Masayuki Andoh, all of Chiba; Masao Gomi; Morihiko Yamada, both of Nagano, all of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/440,422

(22) Filed: Nov. 15, 1999

(51) Int. Cl.[7] .................. G03B 27/32; G03B 27/52; G03B 27/00
(52) U.S. Cl. .................. 355/400; 355/405; 355/27; 355/40
(58) Field of Search .................. 355/400, 405–408, 355/27–29, 40–41

(56) References Cited

U.S. PATENT DOCUMENTS 5,005,043 * 4/1991 Kobayashi et al. .................. 355/27
5,057,860 * 10/1991 Suzuki .................. 352/27

* cited by examiner

Primary Examiner—Russell Adams
Assistant Examiner—Hung Henry Nguyen
(74) Attorney, Agent, or Firm—Adams & Wilks

(57) ABSTRACT

A printer for intermittely feeding printing sheets to which a photoconductive microcapsule is applied in a sheet feeding direction and printing images on the printing sheets, includes a frame, an exposure head which is supported by the frame and irradiates light to the sheets to form a latent image thereon; and a pressing and developing head which is supported by the frame so as to reciprocate in a scanning direction intersecting the sheet feeding direction on the downstream side of the exposure head with respect to the sheet feeding direction and applies pressure to the latent image forming part of the sheet in cooperation with a sheet supporting means disposed on the rear surface side of the sheet to develop a latent image. The pressing and developing head is supported by a support base supported on the frame main body and extending in the scanning direction of the sheet independently of the exposure head so as to apply a pressing and developing force to the sheet and can reciprocate in the scanning direction on the support base.

17 Claims, 13 Drawing Sheets

PRINTER USING PRINTING SHEET TO WHICH PHOTOSENSITIVE MICROCAPSULE IS APPLIED AND PRINTING SYSTEM USING PRINTER

BACKGROUND OF THE INVENTION

1. Field of the Invention

The present invention relates to a printer that intermittently feeds printing sheets to which a photoconductive microcapsule is applied in a sheet feeding direction and prints images thereon and a printing system using this printer.

In this specification, a "photoconductive microcapsule" indicates a micro-capsule that is constituted to be readily collapsible or hardly collapsible, in other words, a latent image is formed when it is irradiated with the light of a specific wave length area and in which a coloring material capable of forming or developing a specific color when it is collapsed is contained, more typically sealed.

2. Description of the Related Art

A printer of a type that printing sheets to which a photoconductive micro-capsule is applied are intermittently fed in a sheet feeding direction and images are printed thereon is disclosed in Japanese Unexamined Patent Publication No. 10-48801 and Japanese Unexamined Patent Publication No. 10-147027. The printer of this type comprises a carriage capable of reciprocating in a scanning direction substantially perpendicular to the sheet feeding direction of the printer, an exposure head or a printing head fixed to the carriage and a pressing and developing head attached to the carriage on the downstream side of the exposure head with respect to the sheet feeding direction. Further, in this printer, as the carriage moves in the scanning direction, the exposure head performs exposing and scanning operations relative to an area of one line on the sheet to be exposed and scanned and the pressing and developing head simultaneously performs pressing, developing and scanning operations relative to an area of one line on the sheet to be developed and scanned on which a latent image is formed after an exposing process.

In such a conventional printer, since the exposure head and the pressing and developing head are integrally supported by the carriage, the pressing force of the pressing and developing head is supported by the carriage and the carriage is supported by a supporting body thereof, when the carriage supporting the pressing and developing head receives such a force as to separate the carriage from the sheet upon pushing operation by the pressing and developing head, the supporting body for supporting the carriage may be possibly slightly bent, so that there is a fear that the distance between the exposure head supported by the carriage and the sheet is varied. Further, since the supporting body of the carriage serves as a guide for moving the carriage in the scanning direction, there is a fear that clearance between the carriage and its supporting body due to abrasion or the like. Therefore, when the carriage supporting the pressing and developing head receives such a force as to separate the carriage from the sheet upon pushing operation by the pressing and developing head, the position of the carriage relative to the supporting body shifts from a prescribed position due to the reaction against the pressing force of the pressing and developing head, hence there is a fear that the positional relation between the exposure head and the sheet shifts from a prescribed state. As a consequence, in such a printer, conditions for exposing the sheet by the exposure head, that is to say, conditions for forming a latent image vary, so that it may be possibly difficult to form and print a prescribed latent image (formation of the latent image and pressurizing development).

Note that, as a pressing and developing device, has been known a printer of a type which uses a pair of rollers having the length corresponding to the width of a sheet and rotating about the axis in a width direction of the sheet and in a sheet feeding direction (disclosed in Japanese Unexamined Patent Publication No.10-48800). However, since the printer of this type is not designed to scan a pressing and developing head, all the areas of the width of the sheet need to be pressed uniformly and simultaneously. Therefore, not only an extremely great pressing force is required, but also widthwise entire areas may be possibly scarcely developed uniformly.

SUMMARY OF THE INVENTION

The present invention has been made in view of the above described problems and it is an object of the present invention to provide a printer in which an exposing operation can be properly carried out by an exposure head irrespective of the pressing and developing operations by a scanning type pressing and developing head and a printing system using the printer.

In order to achieve the above described object, according to the present invention, there is provided a printer for intermittently feeding printing sheets to which a photoconductive microcapsule is applied in a sheet feeding direction and printing images on the printing sheets, the printer comprising: a frame; an exposure head which is supported by the frame and irradiates light to the sheets to form a latent image thereon; and a pressing and developing head which is supported by the frame so as to reciprocate in a scanning direction intersecting the sheet feeding direction on the downstream side of the exposure head with respect to the sheet feeding direction and applies pressure to the latent image forming part of the sheet in cooperation with a sheet supporting means to develop a latent image, the pressing and developing head being supported by a support base supported on a frame main body and extending in the scanning direction of the sheet independently of the exposure head so as to apply a pressing and developing force to the sheet and being capable of reciprocating in the scanning direction on the support base.

In the printer according to the present invention, since the pressing and developing head is supported by the support base supported by the frame main body and extending in the scanning direction of the sheet independently of the exposure head so as to apply the pressing and developing force to the sheet and can reciprocate in the scanning direction on the support base, even if the support base of the pressing and developing head is deformed due to the pressing or pushing operation of the sheet as the result of the pressing and developing operation by the pressing and developing head, there will be little fear that the deformation causes the distance between the exposure head and the sheet to be varied. Accordingly, the exposure head can assuredly perform a suitable exposing operation so that the quality of a latent image formed by the exposing operation can be improved and the quality of an image formed by pressing and developing operations can be enhanced.

Here, as long as the "support base" of the pressing and developing head is supported on the frame main body, it may constitute a part of the frame or a body separate from the frame. Further, that the support base of the pressing and developing head "supports" the pressing and developing head means that the support base receives and bears a force for pressing and developing the sheet, namely, pressing force or a pushing force from the pressing and developing head. Still further, the pressing and developing head is supported by the support base of the pressing and developing head "independently of the exposure head" means that a pressing and developing force is not directly transmitted to the exposure head but is born by the support base of the pressing and developing head.

In the printer of the present invention, the distance between the pressing and developing head and the sheet supporting means may be strictly defined so that the pressing and developing force located within a prescribed range can be applied to the latent image forming part of the sheet. However, a biasing means is preferably provided for biasing at least one of the support base and the sheet supporting means to the other so that the pressing and developing head supported by the support base cooperates with the sheet supporting means to press the latent image forming part of the sheet and develop a latent image when the pressing and developing head is moved in the scanning direction on the support base.

In the printer of the present invention, (1) a pressing and developing head driving means may be provided for moving the pressing and developing head in a reciprocating manner relative to the frame independently of the exposure head (also referred to as a "first aspect", hereinafter) or (2) the exposure head and the pressing and developing head may be housed in a common carriage and the carriage may be supported by the frame so as to reciprocate in the scanning direction (referred to as a "second aspect", hereinafter). In the case of the printer according to the first aspect, the pressing and developing head may be a type stationary on the frame or a type movable in the scanning direction with respect to the frame independently of the exposure head. In the case of the printer according to the second aspect, although the pressing and developing head is housed in the common carriage so as to move together with the exposure head in the scanning direction, the pressing force of the pressing and developing head is not directly received nor supported by the carriage but by the supporting body of the pressing and developing head. Therefore, there is very little fear that abrasion or the like is generated between the carriage and the supporting body of the carriage. Even when the pressing and developing head receives such a force as to be separated from the sheet upon pushing operation by the pressing and developing head, there is very little fear that the position of the carriage relative to the supporting member of the carriage shifts from a prescribed position or the positional relation between the exposure head and the sheet shifts from a prescribed state due to the reaction against the pressing force of the pressing and developing head, According to the first aspect, the printer of the present invention includes, in order to attain the above described object, the pressing and developing head capable of reciprocating in the scanning direction of the sheet intersecting the sheet feeding direction on the downstream side of the exposure head with respect to the sheet feeding direction, supported by the frame separately from the exposure head and pressing the latent image forming part of the sheet in cooperation with the sheet supporting means disposed in the back surface side of the sheet to develop a latent image, and a driving means of the pressing and developing head for reciprocating the pressing and developing head relative to the frame.

In this case, since the exposure head is supported by the frame independently of, or separately from the pressing and developing head, there is very little fear that the distance between the exposure head and the sheet is varied under the pressing and pushing force of the sheet which results from the pressing and developing operation by the pressing and developing head, the exposure head can assuredly perform a suitable exposing operation, the quality of a latent image formed under the exposure can be improved and the quality of an image obtained by the pressing and developing operations can be enhanced.

Further, in this case, since the pressing and developing head is supported by the frame independently of the exposure head and can make a reciprocating motion in the scanning direction. Therefore, the scanning operation of the pressing and developing head can be carried out under optimum conditions for pressure and development. For example, the pressing and developing head can perform for a prescribed number of times scanning operations for pressing and developing operations (for instance, only a forward movement or a return movement in one direction (once), forward and return movements (twice in total), or desired number of times or more times) relative to an area of one line of the sheet to be exposed irrespective of the exposing operation by the exposure head. In this connection, although the scanning direction is generally perpendicular to the sheet feeding direction, the scanning direction may not be perpendicular to the sheet feeding direction according to circumstances, as long as it intersects the sheet feeding direction.

In this specification, the "printing sheet" or the "sheet" indicates a "sheet shaped material on which the photoconductive microcapsule is applied and images can be printed by the exposing operation by the exposure head and the pressing and developing operations by the pressing and developing head". The base substance or the substance material of the sheet may be other materials such as a plastic material or paper. The sheet shaped material may have any three-dimensional configuration as long as it has such width, length and thickness as to be intermittently supplied in the sheet feeding direction upon printing. Further, the frame means a frame body that applies a mechanical rigidity to the printer (device) and includes what is called a "chassis" having a bottom wall and side walls. The "rigidity" of the frame means that there is not generated in the frame such a deformation as to substantially interfere with the operations of other elements depending on the operations of various kinds of elements supported by the frame, however, the generation of a little deformation or vibration may not be eliminated.

The microcapsule is generally composed of three types capable of coloring depending on the respective lights of three kinds of wave length areas corresponding to the three primary colors of light. However, the microcapsule may be composed of one, two or more of arbitrary number of types capable of coloring depending on the lights of one, two or more of arbitrary number of specific wave length areas. The microcapsule of each type is generally distributed uniformly on the surface of the sheet to which the microcapsule is applied. However, the distribution of the microcapsule may sometimes differ depending on the areas of the sheet.

The exposure head generally has three kinds of light sources designed to emit lights of three kinds of wave length areas respectively corresponding to the three kinds of microcapsules. Note that, the exposure head may be provided with a light source for emitting, for example, white light. In this case, the exposure head may or may not be provided with other light sources for emitting the lights of narrow wave length areas corresponding to specific colors.

The exposure head generally has an aperture means or a diaphragm means for restricting a beam outgoing from a light source and exposing the prescribed area of the sheet in addition to a light source such as an LED (light emitting diode). The aperture of the aperture means (an opening for a diaphragm) is generally formed in a circular shape, however, it may be sometimes formed in other shapes such as an elliptical shape, a rectangular shape or a polygonal shape. As the light source, a surface light source is more preferable than a point light source, however, the point light sources may be actually used if circumstances require. Whatever light sources are employed, since the beam from the light source is broadened to some extent, it is preferable to maintain the constant distance between the exposure head and the area of the sheet to be exposed as much as possible, because, when the distance between the exposure head and the area of the sheet to be exposed changes, the diameter of the beam irradiated to the area of the sheet to be exposed through the aperture (the opening for the diaphragm) of the aperture means of the exposure head changes. According to the printer of the present invention, since the exposure head is supported by the frame of the printer independently of the pressing and developing head, there is very little fear that the distance between the exposure head and the area of the sheet to be exposed is varied due to the movement of the pressing and developing head toward the scanning direction. If desired, a collimating means for a beam or an optical image forming system, etc may be provided between the light source and the aperture means or the area to be exposed, in place of the aperture means or in addition to the aperture means.

The exposure head may be formed as a line exposure head formed by arranging a light source entirely in the configuration of an array and fixing it in a stationary condition to the frame so as to expose all the areas of one line of the sheet in the scanning direction, or may be designed to reciprocate in the scanning direction relative to the frame. In the case of the latter, the exposure head is supported by the frame so as to move in a reciprocating manner in the scanning direction and the printer further includes an exposure head driving means for reciprocating the exposure head relative to the frame.

Now turning to the pressing and developing head, while the support base thereof may be substantially immovable relative to the frame main body and the sheet supporting means may bear such a force as to be biased toward the pressing and developing head by the biasing means, preferably, the sheet supporting means is constituted to be substantially immovable relative to the frame main body and the biasing means is constituted to apply a force for biasing the support base to the sheet supporting means. Here, "substantially immovable relative to the frame main body" means substantially immovable in the direction on which a pressing and developing force is exerted relative to the frame when the force for pressing and developing the sheet is exerted on the sheet. In this case, even if the pressing and developing head is located at any position in the scanning direction, the sheet is supported on its back surface by the sheet supporting means substantially immovable relative to the frame main body irrespective of the pressing force by the pressing and developing head. Therefore, there is very little fear that such a force as to twist the sheet about the axis in the sheet feeding direction is applied to the sheet. Accordingly, the sheet can maintain a configuration specified by the sheet supporting means, for example, a planar configuration.

Further, in this case, although an elastically deformable layer may be formed in the support base of the pressing and developing head or the sheet supporting means itself, preferably, the biasing means is composed of an elastic supporting means or an elastic biasing means. In this instance, there is very little fear that the support base of the pressing and developing head or the structure of the sheet supporting means itself is complicated.

The pressing and developing head is preferably provided with pressing rollers rolling in the scanning direction and pressing the printing sheet. Only one or two or more pressing rollers may be employed. When a plurality of rollers are used, in order to support rotatably a first pressing roller pressed to the printing sheet and rolling thereon, a second pressing roller (back up roller), is preferably provided, which has the peripheral surface coming into contact and engaging with the peripheral surface of the first pressing roller on the opposite side to the sheet, is rotated upon rotation of the first pressing roller and rolls on a roller support base as the support base of the pressing and developing head. The roller support base is preferably supported on the bottom wall of the frame through the elastic supporting means such as a spring.

In the case of the printer according to the first aspect of the present invention, if desired, a similar pressing roller to the first roller may be provided on either side of the scanning direction relative to the first pressing roller so that a plurality of times of pressing and developing operations can be carried out by scanning in one direction.

A part of the printing sheet on which the pressing rollers roll is supported by the sheet supporting means located on the back surface side (underside) of the sheet. The sheet supporting means is composed of a platen, a similar sheet supporting mechanism (base) such as a similar supporting body or a developing support base with a configuration bent to protrude toward the rollers in section vertical to the scanning direction so that it comes substantially into point contact with the rollers so as to selectively press the part of one line of the sheet to be pressed and developed. At least one element of the pressing rollers and the sheet supporting means, preferably, the pressing rollers are pressed (biased) toward the sheet by means of the elastic means such as a spring or other arbitrary pressing means (biasing means) so that the part of the sheet located between the pressing rollers and the sheet supporting means can be pressed by the pressing rollers.

When the pressing and developing head is located at one end or at both ends in the scanning direction, the sheet supporting means preferably substantially releases the pressing and holding operations to the sheet between the pressing and developing head and itself and, if desired, permits the sheet to be supplied in the sheet feeding direction such as the intermittent feed of one pitch, the guide of the tip end (leading edge) of the sheet at an initial time, the delivery of the rear end (trailing edge) of the sheet, etc.

In the case of the printer according to the first aspect of the present invention, as long as the driving means of the pressing and developing head and the driving means of the exposure head can reciprocate their heads respectively in the scanning directions, they may be designed to reciprocate the heads along guide means such as a guide rod or a guide rail through engaging means (for example, a pin) engaging with spiral grooves formed on the peripheral surfaces of rotary shafts, they may be designed to reciprocate the heads along the guide means (for example, the guide rod or guide rail) through engaging parts (for example, slots long in the sheet feeding direction) engaging with engaging means (for example, an engaging pin) formed integrally with a timing belt extending between a pair of timing pulleys and circulated by the pulleys, or they may have other structures. The structure of the driving means of the pressing and developing head may be similar to that of the driving means of the exposure head or may be different from that of the driving means of the exposure head. When the timing belt having the engaging means formed integrally therewith is employed as the driving means of the pressing and developing head, it is preferable to reciprocate the pressing and developing head in the scanning direction for pressing and developing one line, in order to avoid pressure conditions from being different due to the difference in positions of the engaging pin in the forward scanning movement and in the return scanning movement of the pressing and developing head. As a driving source for the driving means of the pressing and developing head and the driving means of the exposure head, a prime mover such as an electric motor or other driving sources may be employed.

In the case of the printer according to the second aspect of the present invention, a carriage driving means may be configured in a similar manner to the driving means of the pressing and developing head or the driving means of the exposure head according to the above described first aspect of the invention. In the case of the printer according to the first aspect, when the exposure head can be reciprocated in the scanning direction, the scanning direction of the exposure head may be opposite to that of the pressing and developing head at least in one scanning operation. At this time, since the scanning movement of the exposure head generates a force exerted on the frame through the driving means of the exposure head in a direction opposite to that of a force exerted on the frame through the driving means of the pressing and developing head by scanning movement of the pressing and developing head, an influence of the scanning operations by two kinds of heads applied to the frame is cancelled, so that the vibration of the frame can be minimized.

In the case of the printer according to the first aspect of the present invention, when the exposure head can be reciprocated in the scanning direction, the number of times of exposing operations by the exposure head may be equal to or different from that of pressing, developing and scanning operations of the pressing and developing head relative to the area of one line of the printing sheet to be exposed by scanning. In the case of the former, for instance, the scanning directions of two types of heads may be always opposite to each other.

In the case of the printer according to the first aspect of the present invention, when the number of times of exposing operations by the exposure head is different from that of pressing, developing and scanning operations by the pressing and developing head relative to the area of one line of the printing sheet to be exposed by scanning, the number of times of exposing operations for one line may be increased more than that of pressing, developing and scanning operations, or, on the contrary, the number of times of pressing, developing and scanning operations for one line may be increased more than that of exposing operations. In the case of the former, a current for driving a light source for exposure such as an LED is decreased so that the driving energy of the light source can be reduced, and the exposing energy of the exposure head required for one scanning operation is lowered so that the level of exposing energy applied to the sheet can be changed in multiple stages, or the number of light sources for exposure to be disposed in the sheet feeding direction can be decreased. On the other hand, in the case of the latter, since the pressing force by the pressing and developing head can be decreased, a force which the supporting structure of the pressing and developing head receives can be decreased. Accordingly, the pressing and developing head including the supporting structure can be made compact.

Further, in the case of the printer according to the first aspect of the invention, for instance, even if the pressing and developing head begins to be driven after the leading edge (tip end) of the printing sheet reaches the pressing and developing head upon controlling independently of the exposing operation by the exposure head and the pressing and developing operation by the pressing and developing head, the exposure head may be driven only when the printing sheet is located in the front face of the exposure head. In other words, the exposure head may not be driven when the printing sheet is not located in the front face of the exposure head such as the trailing edge of the printing sheet has passed the exposure head. In this case, there are provided a sheet sensor for directly or indirectly detecting whether or not the sheet is present in the front face of each head and a clutch means for transmitting the driving force of a driving source to each head or releasing the transmission thereof by the sensor. When the driving of the exposure head is stopped, the feed of electric current to the exposure head may be controlled to suppress or stop the light emission from the light source of the exposure head. However, in the case of a light source which takes relatively long time for stabilization such as a semiconductor laser or a light source which is low in its speed of response, an electronic control shutter or a mechanical control shutter such as a liquid crystal shutter may be provided in the front face of the exposure head so as to interrupt an optical path.

Further, also in the case of the printer according to the second aspect of the present invention, the exposure head may be driven only when the printing sheet is located in the front face of the exposure head like the printer according to the first aspect.

Preferably, a sheet feeding mechanism is provided which feeds the sheet while it holds a substantially widthwise entire area of the sheet. In the printer according to the first aspect of the present invention, this sheet feeding mechanism is preferably provided between the exposure head and the pressing and developing head with respect to the sheet feeding direction. In this case, when the scanning operation is carried out for exposing and pressing and developing processes, the sheet feeding mechanism is stopped to hold the whole part of the sheet in the direction of width thereof. Therefore, when the exposure head comes into close contact with the pressing and developing head upon scanning operation, even if a distortion is generated in the sheet due to the pressure on the sheet by the pressing and developing head, there will be very little fear that the distortion is transmitted to the part of the sheet located in the front face of the exposure head. Further, a sheet feeding mechanism on the upstream side with the same structure is preferably further provided on the upstream side of the exposure head so as to feed the sheet to the exposure head. At this time, the part of the sheet present in the front face of the exposure head is held by the downstream and upstream sheet feeding mechanisms respectively at its front and rear parts in the sheet feeding direction. Therefore, upon exposure, the part of the sheet can be assuredly held while it maintains a prescribed positional relation relative to the head.

The printer described above carries out a printing operation on the basis of print pattern information or data such as graphics, characters, etc, supplied to the exposure head. Therefore, a printing system can be constituted in such a way that the printer is connected to another information processor such as a video camera or a personal computer through a proper interface cable and the printer receives the print pattern information in the form of a digital or an analog signal (video signal) through the interface cable. The control of transfer or transmission of the print pattern information to the exposure head may be performed on the information processor side or the printer side. In this connection, the printing system comprises the printer and the information processor connected to the printer through an information transferring means such as the interface cable. It should be noted that a reading device for reading information stored in an auxiliary storing medium such as a magnetic information recording medium (a magnetic disk or the like), an optical information recording medium (an optical disk or a photoelectro-magnetic disk, or the like.) or a non-volatile semiconductor memory card (CF (compact flash) card) may be provided in the printer so that the reading device of the printer reads the print pattern information from the auxiliary storing medium and the read information is printed.

BRIEF DESCRIPTION OF THE DRAWINGS

Other characteristics will appear on reading the description which follows with reference to the accompanying drawings in which:

FIG. 4(a) is an explanatory view of the exposure head viewed from a front surface side thereof.

FIG. 4(b) is an explanatory view showing the relation between one light source and a diagram aperture of the exposure head and the printing sheet.

FIG. 4(c) is an explanatory view of a latent image formed under an exposure process by the light source and the diaphragm aperture of FIG. (b);

DESCRIPTION OF THE PREFERRED EMBODIMENTS

Now, the present invention will be described in more detail the basis of preferred embodiments illustrated in the companying drawings.

Figure 4:
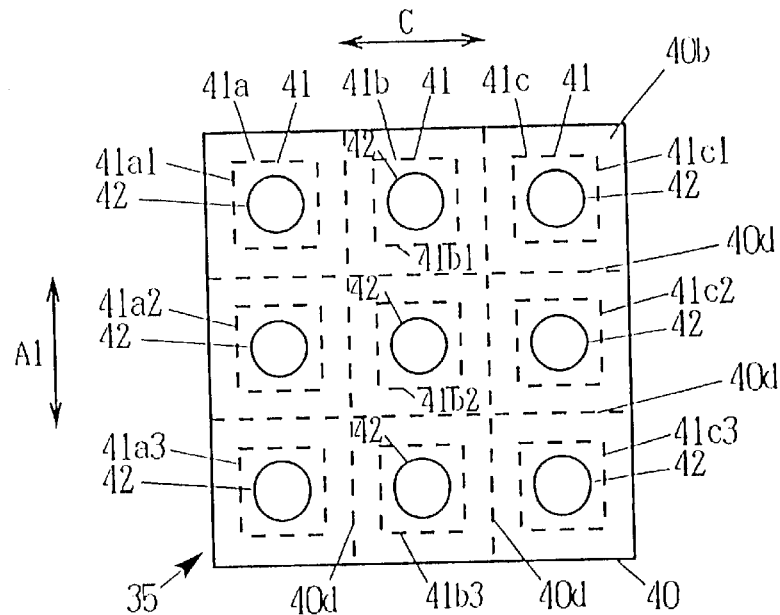
FIG. 4 are explanatory views showing the relation between an exposure head and a sheet.
Figure 4:
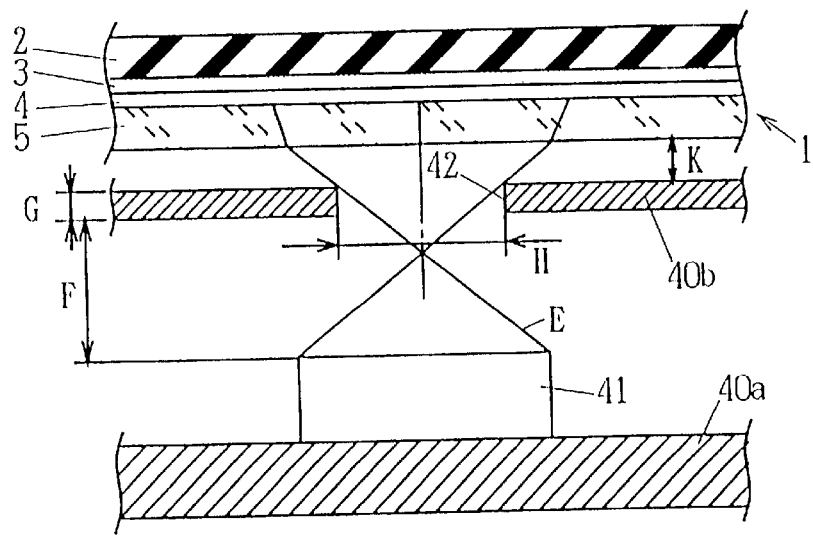
Figure 4:
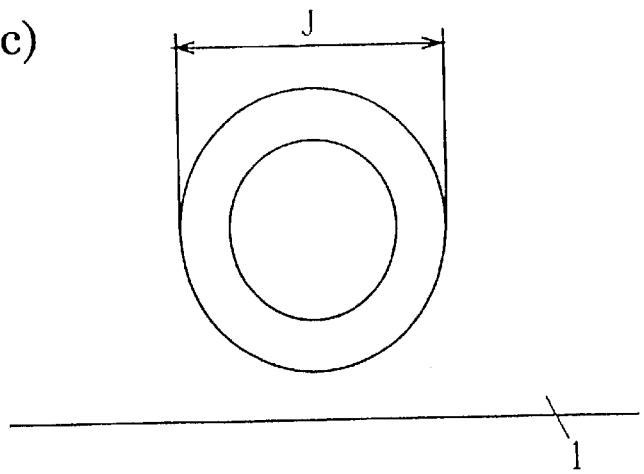

Initially, a printing sheet 1 used in the printer according one preferred embodiment of the present invention will be described before the structure of the printer of one preferred embodiment according to the first aspect of the present invention, at is to say, a first preferred embodiment of the invention is planned. As shown in FIG. 4, the printing sheet 1 is composed a sheet shaped base substance part (base material part) 2 made white PET (polyethylene terephthalate), an image receiving layer including a developer formed on the sheet shaped base substance part 2, a photoconductive microcapsule layer 4 formed by uniformly applying on the image receiving layer 3a to binder (adhesive agent) in which photoconductive microcapsules are uniformly dispersed and a protective layer 5 such as a transparent PET. The binder is not included in the microcapsule layer 4. The image receiving layer 3 and the microcapsule layer 4 may be formed in one mixture layer. The photoconductive microcapsule has a transparent outer capsule wall with several microns or so made of gelatin or the like. In the capsule wall, are sealed a photo-curable material which is cured by the light of specific wave length and a coloring material coloring upon coming into contact with the developer of the image receiving layer 3 when the capsule which is not cured is collapsed. Generally, in each microcapsule, are sealed together a coloring material coloring to any one of three primary colors of pigment upon coming into contact with the developer and a photo-curable material cured by the light of color (three primary colors of light) which is actually a complementary color to the color generated from the coloring material. More specifically, the microcapsule comprises three kinds of types. These three types of microcapsules include a microcapsule of a type M in which the coloring material for magenta (M) coloring to red (purplish red) and a photo-curable material for selectively absorbing green light (G) complementary thereto to be cured are sealed, a microcapsule of a type Y in which a coloring material for yellow (Y) coloring to yellow and a photo-curable material cured by blue light (B) are sealed and a microcapsule of a type C in which a coloring material for cyan (C) coloring to blue (purplish blue) and a photo-curable material cured by red light (R) are sealed. In the microcapsule layer 4, the three kinds of microcapsules are uniformly dispersed and applied.

For example, when a color printing process is applied to the printing sheet at the rate of 300 dpi, one dot is formed in an area of diameter of about 85 u. This dot area is irradiated with, for example, the red light from the exposure head, the photo-curable material in the microcapsule of the type C is cured, however, the photo-curable materials in the microcapsules of the types M and Y which are not cured are not cured, so that a red latent image is formed in this dot area. When the dot area is placed under the pressure of the pressing and developing head, the cured microcapsule of the type C is held as it is. However, the microcapsules of the types M and Y are collapsed, so tat the respective coloring materials react to the developer in the image receiving layer 4 to obtain the colors of purplish red and yellow, and red as a whole. The degree to which the microcapsule of the type C is cured depends on the intensity of light (quantity of light)

irradiated to the dot area. Accordingly, the microcapsule of the type C is only slightly collapsed or is not collapsed at all on the basis of the intensity of light. Thus, the degree of mixing blue in the dot area is changed. Therefore, the degree of curing is different between the three types of microcapsules and the colors generated as the result of collapse of the microcapsules are different from one another.

Now, referring to FIGS. 1 to 4, there will be described a printer 10 and a printing system 100 using the printer 10 of the first preferred embodiment according to the first aspect of the present invention.

In the printer 10, a reference numeral 30 designates an exposure part for forming the latent image of a prescribed print pattern on the printing sheet 1. 50 designates a pressing and developing part for visualizing the latent image formed on the printing sheet 1 and 70 designates a motor for driving the respective movable parts of the printer 10. The printer 10 may have such a size as to be placed on the palm of the hand or such a size as to be mounted and employed on a desk. The printing system 100 comprises the printer 10 and an image information processor 90 such as a digital camera connected to the printer 10 through an interface cable 91. Image information (print pattern information) in a digital or an analog form is supplied from the image information processor 90 to the exposure part 30 through a cable 10b under the control of a controller 10a of the printer 10.

Figure 1:
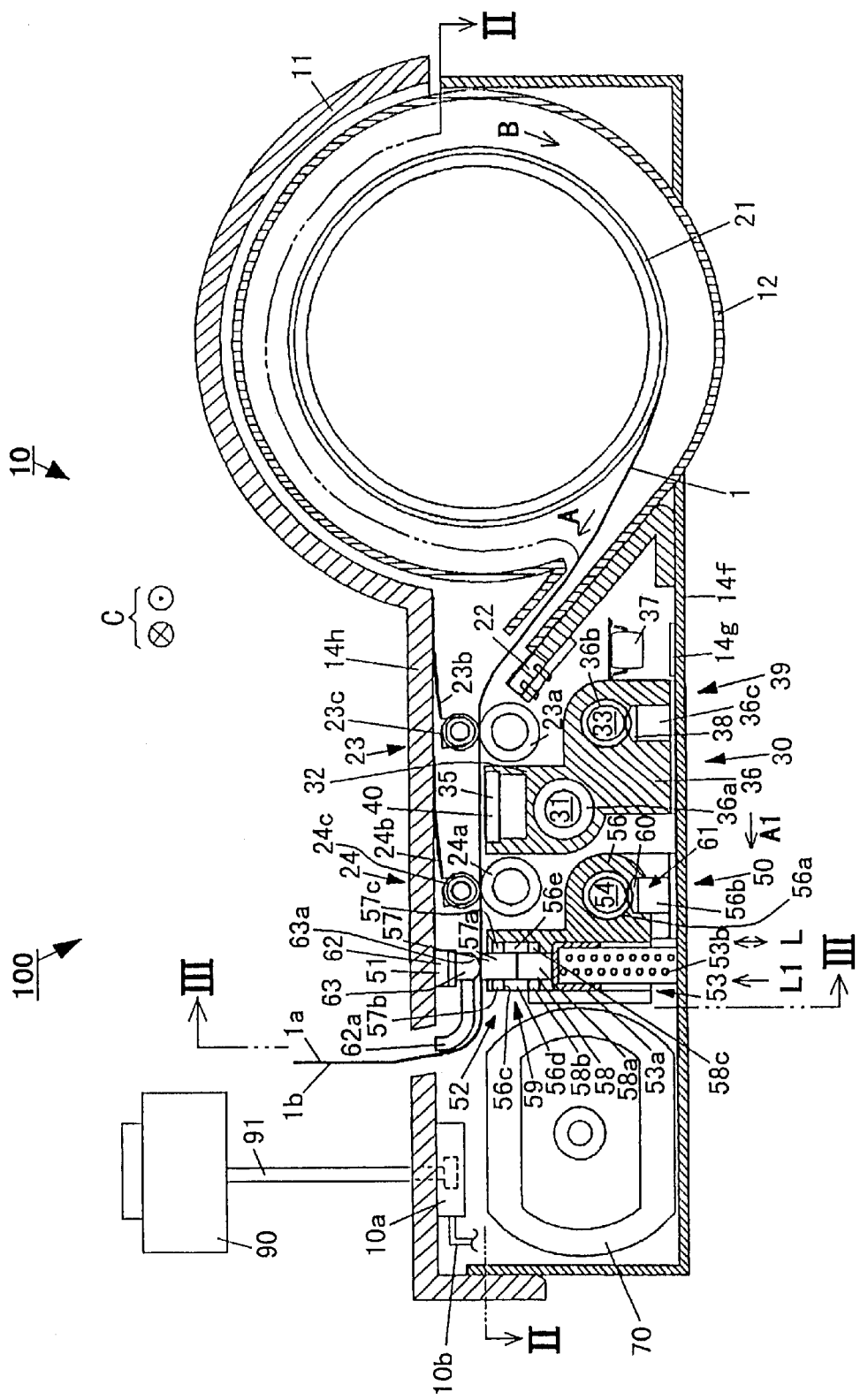
FIG. 1 is an explanatory sectional view taken along the line I—I in FIG. 2 showing a preferred embodiment of a printer according to one aspect of the present invention, namely, a first embodiment.

The printing sheet 1 is housed in a cylindrical sheet housing part (housing chamber) 12 in a casing 11 of the printer 10 in the form of a roll 21 which can be supplied from its tip end. The casing 11 can be opened and closed in the upper part of the chamber 12 (not shown) so as to house and arrange the roll 21 in a prescribed position of the chamber 12. The roll 21 of the printing sheet 1 is rotatably supported on a pair of side walls 13 of the chamber 12. When the printing sheet 1 is supplied in a direction A, the roll 21 is rotated in a direction B in the sheet housing part 12. The sheets 1 may be stacked in a sheet tray or a stacker in place of a continuous sheet and have prescribed size so as to be supplied one sheet by one sheet by means of pick-up rollers. In FIG. 1, the sheet 1 is wound so that the sheet shaped base substance part 2 is located inside the roll 21. When the printing sheet 1 is supplied in the direction A, the microcapsule layer 4 is located on the lower side of the base substance part 2. A reference numeral 22 designates a sheet sensor for detecting whether or not the trailing edge (rear end) of the sheet 1 passes or whether or not the sheet 1 is present in the front face of the exposure head. Further, a driving source may drive the roll 21 to rotate, and when there is provided a guide path through which the tip end of the sheet is introduced to a sheet feeding mechanism, the sheet sensor may also detect that the leading edge (tip end) of the sheet 1 passes.

The supply and feed of the sheet in the direction A are carried out by sheet feeding mechanisms 23 and 24 on the upstream side and the downstream side with respect to the sheet feeding direction A. As the sheet 1 is fed from the roll 21 in the direction A, the sheet 1 is fed in a direction A1 along the horizontal planes of the exposure part 30 and the pressing and developing part 50. The sheet feeding mechanisms 23 and 24 respectively comprise sheet feed rollers (feed rollers) 23a and 24a which receive a rotary driving force and pinch rollers or nip rollers 23c and 24c opposed to the rollers 23a and 24a and pressed downward toward the sheet 1 by leaf springs 23b and 24b so as to feed the sheet in the direction A by holding the sheet 1 therebetween. The feed rollers 23a and 24a are formed by fitting and fixing, for instance, tubular bodies made of rubber to steel shaft bodies. The pinch rollers 23c and 24c are composed of, for example, plastic unitary bodies.

The exposure part 30 comprises an exposure head guide shaft 31 both ends of which are fixed to the side walls 14a and 14b of a frame 14, an exposure head structure 32 fitted to and supported by the guide shaft 31 so as to be slidable in a scanning direction C perpendicular to the feeding direction A1 of the sheet 1 and an exposure head driving shaft 33 for moving the structure 32 in the scanning direction C. The exposure head driving shaft 33 is supported by the side walls 14a and 14b of the frame 14 so as to be rotatable about its axis (the detail of a supporting structure is not shown) and has a spiral groove 34 formed on its peripheral surface. The spiral groove 34 includes clockwise and counterclockwise spiral groove parts 34a and 34b and turn-back groove parts 34c and 34d for connecting together both the spiral groove parts 34a and 34b. The exposure head structure 32 comprises an exposure head main body part 35 disposed so as to be opposed to the printing sheet 1 between the upstream and downstream sheet feeding mechanisms 23 and 24, an exposure head support part 36 for supporting the head main body part 35 and a head position sensor or an encoder 37 formed integrally with the exposure head support part 36. The exposure head position sensor 37 reads a scale 14g (for example, scale marks written at prescribed intervals in the scanning line C) formed on the bottom wall (bottom wall of a chassis) 14f of the frame opposed to the sensor 37 along the scanning path of the exposure head position sensor 37 and detects the position of the exposure head main body part 35 in the scanning direction C in cooperation with the controller 10a. Thus, the exposure by the exposure head main body part 35 is controlled by the controller 10a on the basis of the detected positional information.

The exposure head support part 36 includes holes 36a and 36b into which the exposure head guide shaft 31 and the exposure head driving shaft 33 are inserted in the scanning direction C and a vertical hole 36c connected to the hole 36b in addition thereto. In the vertical hole 36c, is arranged an engaging pin 38 engaging with the spiral groove 34 of the exposure head driving shaft 33 so as to be movable vertically. The engaging pin 38 is held in such a state that the pin 38 is biased to and engaged with the upper spiral groove 34 by a biasing and engaging mechanism 39 of the pin 38. When the pin 38 is engaged with the clockwise spiral groove part 34a, the exposure head structure 32 is slid and guided by the guide shaft 31 and moved in a scanning direction C1 with the rotation of the exposure head driving shaft 33 in a direction D. When the pin 38 enters the counterclockwise spiral groove part 34b through the turn-back groove part 34c, the exposure head structure 32 returns in a scanning direction C2 with the rotation of the exposure head driving shaft 33 in the direction D.

As illustrated in FIG. 1, FIGS. 4(a) and 4(b), the exposure head main body part 35 comprises a hollow and flat box body 40, light sources 41 composed of three lines and three columns fixed to the bottom wall 40a of the box body 40 and Diaphragm apertures 42 composed of three lines and three columns formed on the top wall 40b of the box body 40 in positions facing the respective light sources 41. Here, the top wall 40b functions as an aperture means or an aperture board. The light sources 41a, 41b and 41c in the respective columns are respectively those of the same color. For example, the light sources of the first to third lines of the first column are composed of red LEDs 41a1, 41a2 and 41a3. The light sources of the first to third lines of the second column are composed of green LEDs 41b1, 41b2 and 41b3 and the light sources of the first to third lines of the third column are composed of blue LEDs 41c1, 41c2 and 41c3. Spaces between the lines of the light sources 41 correspond, for instance, to pitches upon intermittently feeding the sheet 1 in the direction A1 by the sheet feeding mechanisms 23 and 24. On the other hand, the spaces between the columns of the light sources 41 correspond to the shifts in positions in the scanning direction (also referred to as "phases in a scanning direction") of the light sources 41a, 41b and 41c due to the colors during the scanning operation of the exposure head main body part 35 in the direction C. Therefore, when the exposure head main body part 35 moves in the scanning direction for an exposure process, while compensating the positional shifts in the scanning direction of the light sources 41 related to the color data of respective dot areas in the scanning direction the controller 10b on the basis of the positional information of the exposure head 35 read from the scanning position sensor 37, the exposure head main body irradiates the lights of prescribed colors to the respective dot areas in the scanning direction. While the exposure head main body part 35 sequentially carries out such an operating control relative to the respective dot areas in the scanning direction C, it conducts an exposure to one line in the scanning direction C. The number of columns arranged perpendicularly to the scanning direction C corresponds to the number of three primary colors of light. The number of lines arranged perpendicular to the sheet feeding direction A1 corresponds to the number of light sources required for printing on one point (dot area). If the intensity of light from the light sources is stronger, the number (the number of lines) of the light sources of the respective colors may be more decreased. If the intensity of light is weaker, the number of lines may be more increased. Depending on color, the number of light sources may be changed. The sizes of the diaphragm apertures 42 may be equal or may be different depending on the colors of light restricted or the lines. 40d designates partition walls for partitioning the respective light sources 41.

As shown in FIG. 4(b), a light or beam E emitting from each of the light sources 41 is irradiated to the microcapsule layer 4 of the printing sheet 1 through the diaphragm aperture 42 with aperture diameter H spaced distance F (for instance, F+G, by considering the thickness G of the aperture board 40b as well as the distance F of about 300 to 400 $\mu$) away from the light source 41. As apparent from FIGS. 4(b) and 4(c), the diameter J of the beam E irradiated to the microcapsule layer 4 depends on not only the diameter H (for example, about 200 to 300 $\mu$) of the aperture 42 but also the distance between the light source 41 and the aperture board 40b and the distance K between the aperture board 40b and the printing sheet 1. More specifically, when the distance (F+G+K) between the light source 41 and the printing sheet 1 (for instance, about 400 to 500 $\mu$) varies, the diameter J and intensity of the beam E applied to the microcapsule layer 4 vary. As a consequence, the area or size of the microcapsule layer 4 to be exposed by the irradiation of the light beam E from the light source 41 and the quantity of receiving light per unit area of the microcapsule layer 4 are undesirably changed. In this printer 10, since the exposure part 30 is independently supported (separately from the pressing and developing part 50) by the frames 14a and 14b of the printer 10 with very little fear of a large external force applied to the exposure part 30 and the exposure head main body part 35 is arranged at a position facing the printing sheet 1 between the sheet feeding mechanisms 23 and 24, the distance (F+G+H) between the light source 41 and the printing sheet 1 can be maintained to a constant value. Accordingly, there is very little fear that the diameter J and intensity of the beam E irradiated to the microcapsule layer 4 vary.

Figure 2:
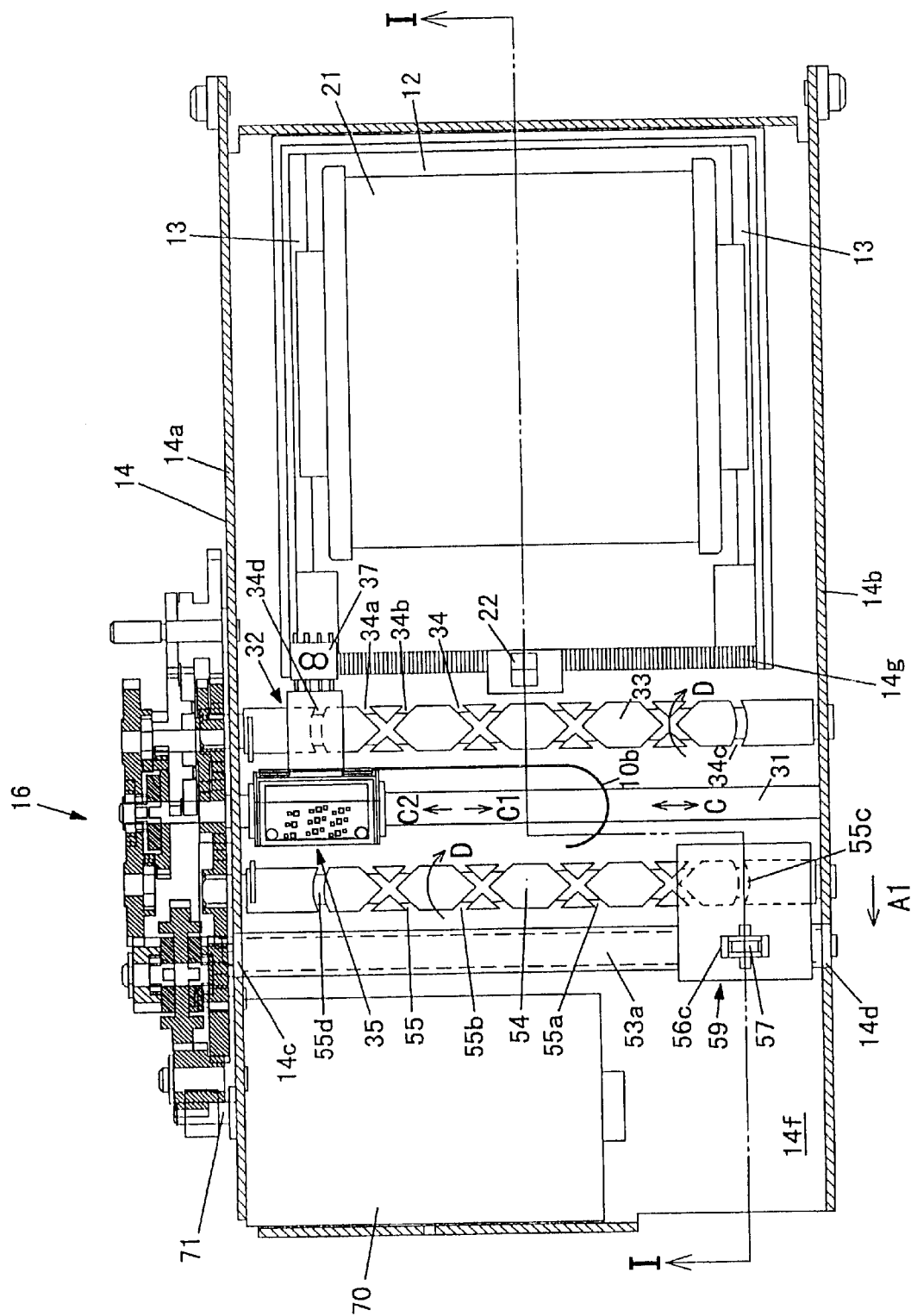
FIG. 2 is an explanatory sectional view taken along the line II—II of the printer shown in FIG. 1 with feed rollers on upstream and downstream sides removed.
Figure 3:
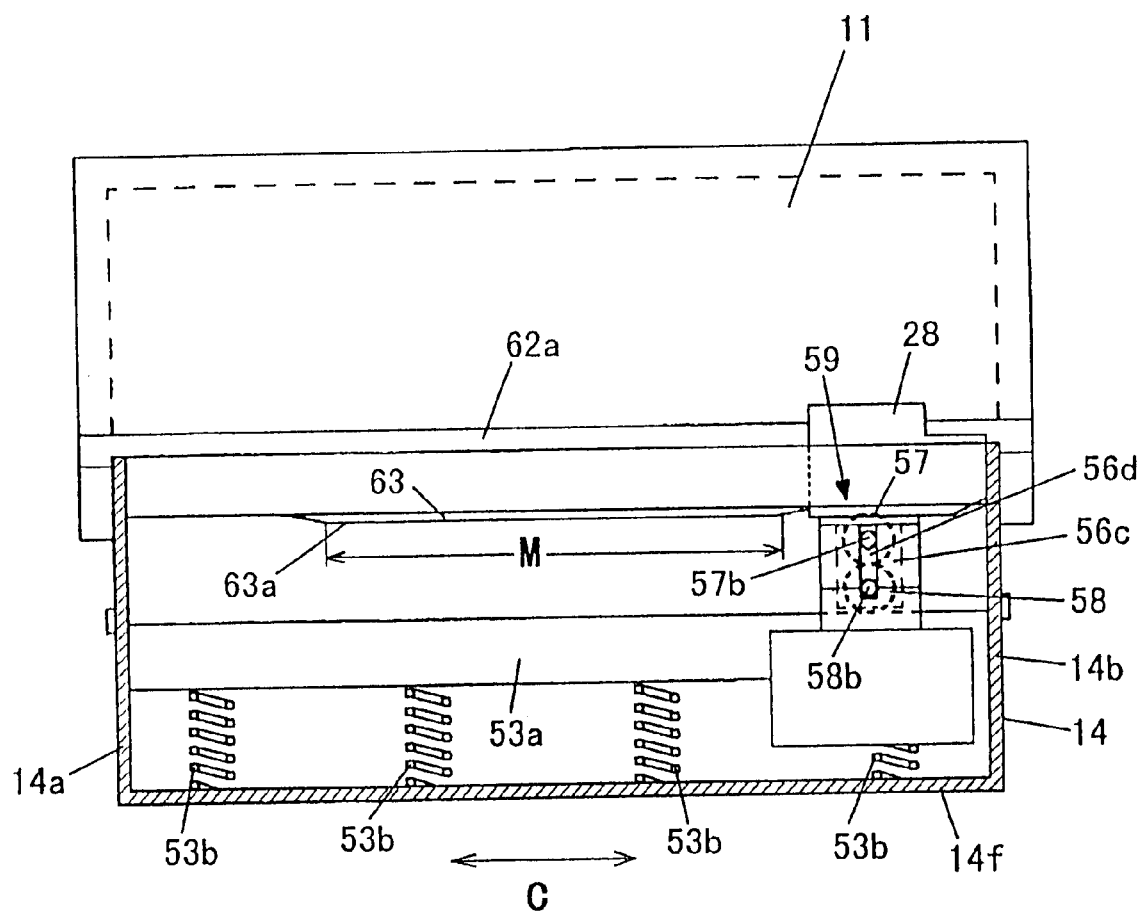
FIG. 3 is an explanatory sectional view taken along the line III—III in FIG. 2.

Referring to FIGS. 1 to 3, the pressing and developing part 50 comprises a pressing and developing head structure 52 supported by the side walls 14a and 14b of the frame 14 independently of the exposure head 35 so as to be movable in a reciprocating manner in the scanning direction C and designed to press the sheet 1 in cooperation with a sheet supporting mechanism or a developing support base 51 as a sheet supporting means disposed on the back surface side of the sheet 1, a roller supporting mechanism (roller support base) 53 for supporting the pressing and developing head structure 52 and a pressing and developing head driving shaft 54 serving as a pressing and developing head driving means for reciprocating the pressing and developing head structure 52 in the direction C relative to the frame 14.

The pressing and developing head driving shaft 54 is supported by the side walls 14a and 14b of the frame 14 so as to be rotatable about its axis (a detailed structure is not shown), and has a spiral groove 55 on its peripheral surface.

For the purpose of supporting the driving shaft 54, a bearing with high radial load withstanding characteristic may be used. The spiral groove 55 includes clockwise and counterclockwise spiral groove parts 55a and 55b and turn-back spiral groove parts 55c and 55d for connecting both the spiral groove parts 55a and 55b.

The roller supporting mechanism 53 comprises a roller support base main body 53a of a U-shape in section (see FIG. 1) as a pressing and developing head support base which extends in the scanning direction C between the side walls 14a and 14b of the frame 14 and is fitted to cut-out parts or slots 14c and 14d formed in the side walls 14a and 14b so as to be movable in a vertical direction L and compression springs 53b for applying a biasing force in an upward direction L1 to the roller support base main body 53a. A plurality of compression springs 53b are provided at prescribed intervals along the scanning direction C.

The pressing and developing head structure 52 comprises a pressing and developing head support part 56 and a pressing and developing head main body part 59 serving as a pressing and developing head composed of a pair of rollers 57 and 58. The pressing and developing head support part 56 has a hole 56a into which the pressing and developing head driving shaft 54 is inserted in the scanning direction C and a vertical hole 56b connected to the hole 56a. In the vertical hole 56b, an engaging pin 60 engaging with the spiral groove 55 of the pressing and developing head driving shaft 54 is arranged so as to be movable vertically.

The engaging pin 60 is biased to and engaged with the upper spiral groove 55 by the biasing and engaging mechanism 61 of the in 60 and held in an engaged state. When the pin 60 is engaged, for instance, with the counterclockwise spiral groove part 55b, the pressing and developing head structure 52 performs a return scanning operation in a direction C2 with the rotation of the pressing and developing head driving shaft 54 in a direction D. When the pin 60 enters the clockwise spiral groove part 55a through the turn-back groove part 55d, the pressing and developing head structure 52 carries out a forward scanning operation in a direction C1 with the rotation of the pressing and developing head driving shaft 54 in the direction D.

The pressing and developing head support part 56 further comprises a roller housing chamber or a through hole 56c in which the main bodies 57a and 58a of the rollers 57 and 58 are housed so as to be movable in the direction L with their peripheral surfaces coming into contact with each other, and grooves 56d and 56e in which shaft parts 57b, 57c, 58b and 58c at both ends of the roller main bodies 57a and 58a are housed so as to be movable in the direction L. The lower roller main body 58a of the roller main bodies 57a and 58a stacked in the chamber 56c is mounted on the roller support base main body 53a with the U-shape in section. The shaft parts 57b, 57c, 58b and 58c may not be provided.

On the other hand, the developing support base 51 (sheet support base) serving as the sheet supporting means located on the back surface 1a side of the sheet 1 comprises a platen support part 62 supported by the frame 14 of the printer 10 and a platen main body 63 having a U-shape protruding downward in cross-section (section perpendicular to the scanning direction C). The lower edge part 63a of the platen main body 63 protrudes toward the pressing and developing head main body 59 within the range of a scanning direction area M to be printed on the sheet 1 and is retracted upward outside both ends of the area M with respect to the scanning direction C. The platen support part 62 is provided with a sheet guide part 62a on the downstream side to deliver the sheet 1 outside the casing 11 of the printer 10.

When the pressing and developing head main body part 59 is located in both end parts of the scanning direction which face the retracted areas at both sides of the central area M of the platen main body 63, the printing sheet 1 can be fed (for instance, intermittent feed of one line, guide of the front end of the sheet or delivery of the rear end of the sheet, etc.) in the sheet feeding direction A1 under the operations of the sheet feeding mechanisms 23 and 24 as desired without being pressed and held therebetween. When the pressing and developing head main body part 59 carries out for a plurality of times pressing and developing operations for one line of the sheet, the sheet 1 is not supplied in the direction A1 during a plurality of times of scanning operations.

On the other hand, when the pressing and developing head main body 50 is located within the range facing the area M at the central part of the platen main body 63 in which a printing operation is permitted, the printing sheet 1 is held in between the main body 57a of the upper roller 57 of the pressing and developing head 59 and the platen main body 63. The roller main body 57a abuts on the front surface 1b of the printing sheet 1 linearly along the sheet feeding direction A1 within the range of the length of the main body 57a, and the platen main body 63 abuts on the back surface 1a of the printing sheet 1 linearly along the direction C perpendicular to the direction A1, so that the part of the sheet pressed and held by the roller 57 of the pressing and developing head 59 and the platen main body 63 constitutes substantially a point at each time. When a pressing force is exerted upon this contact point and a latent image is formed on this contact point, the microcapsules which are not cured are collapsed to color a dot area. The pressing force applied to the contact point at this time depends on the expansion force of the compression springs 53b for pressing and developing exerted upon the roller 57 in the direction L1 through the roller support base main body 53a and the roller 58. The force exerted upon the contact point (a pressed and developed point) is set to a prescribed weight (for example, several ten to several hundred g (weight)) necessary for suitably collapsing the microcapsules by considering the area of the contact point. In this case, a pressing and developing load is born by the part of the casing 11 functioning as the bottom wall 14f of the frame (chassis) 14 on the lower end side of the springs 53b and the top wall 14h of the frame 14. In this embodiment, since the platen main body 63 is substantially immovable in the direction L relative to the frame top wall 14h, the sheet 1 can be supported by the horizontal lower edge part 63a of the platen main body 63. In the chassis bottom wall 14f on the lower end side of the springs 53b, may be provided a member the position of which can be adjusted in the direction L. The position of the above member may be adjusted so that the pressing and developing load can be adjusted. Elastic pressing means such as springs may be provided on the side of the platen so as to press the platen main body 63 to the back surface 1a of the sheet 1, in place of provision of the springs 53b on the side of the pressing and developing head main body part 59.

Thus, when the pressing and developing head driving shaft 54 is driven to rotate so that the pressing and developing head support part 56 and the pressing and developing head main body part 59 are moved in the direction C, the roller main body 58a of the roller 58 rolls on the roller support base main body 53a in the direction C, the roller main body 57a in contact with the roller main body 58a on their peripheral surfaces rotates in synchronization with the rotation of the rotor main body 58a and rolls on the surface 1b of the printing sheet 1 in the direction C to move the contact point (pressing point) with the platen main body 63 in the direction C for a scanning operation.

The pressing and developing operation in the pressing and developing part 50 is carried out by scanning the pressing and developing head support part 56 and the pressing and developing head main body part 59 supported between the roller supporting mechanism (roller support base) 53 and the developing support base (sheet support base) 51 as the pressing and developing head driving shaft 54 is driven to rotate. As long as the frame 14 of the printer 10 is designed to have a sufficient rigidity, there is no fear that the side walls 14a and 14b of the frame 14 or the like are deformed or excessively vibrated due to the pressing and developing operation in the pressing and developing part 50. Therefore, there is no fear that the positional relation between the exposure part 30 and the sheet 1 varies due to the pressing and developing operation in the pressing and developing part 50, which is different from the case in which the exposure head main body part and the pressing and developing head main body part are integrally incorporated in one carriage so that the pressing and developing force of the pressing and developing head is supported by the carriage.

Referring to FIG. 2, a reference numeral 16 designates a power transmitting mechanism for transmitting the rotation of an output shaft 71 of a motor 70 to the upstream and downstream feed rollers 23a and 24a, the exposure head driving shaft 33 and the pressing and developing head driving shaft 54. The power transmitting mechanism 16 may include a one-way clutch, a general tooth gear, etc. as well as a gear train composed of spur gears or bevel gears or the like so as to incorporate various kinds of operation modes such as an initialization of the printer 10 and an initial feed of the sheet as well as an ordinary printing operation required for the printer 10 as the structure of the power transmitting mechanism. In this connection, the power transmitting mechanism 16 may be provided with an electronically controlled power transmitting means so that the various kinds of operation modes of the printer are controlled not only by the mechanical structure of the power transmitting mechanism 16 but also by the controller 10a.

In FIG. 3, a reference numeral 28 designates a cutter for cutting a continuous sheet 1 along the direction C of width. The cutter 28 receives a force for biasing it toward the left end position of FIG. 3 by a spring (not shown). The cutter 28 is manually moved toward the right end position in FIG. 3 along a guide member (not shown) against the resiliency of the spring, so that the sheet 1 can be cut along the direction C of width, for instance, downstream of the sheet feeding mechanism 24 on the downstream and upstream of the pressing and developing part 50. The cutter 28 is returned to an initial position in the left end by separating a hand from the cutter 28.

Now, the operation of the printing system 100 having the printer 10 constructed as described above will be briefly explained below. It is assumed that the printing operation of the last time has been completed while the leading end of the printing sheet is held by the sheet feed mechanism 24 on the downstream side.

When a printing instruction is supplied to the printer 10 while the sheet feeding mechanisms 23 and 24 stop, the motor 70 is driven to rotate so that the exposure head driving shaft 33 and the pressing and developing head driving shaft 56 respectively begin to be driven and rotated through the power transmitting mechanism 16, the exposure head main body part 35 and the pressing and developing head main body part 59 respectively separately begin to move in the scanning direction C from their initial positions, and a scale read signal from the exposure head position sensor 37 is sent to the controller 10a in which the signal is interpreted as the positional information of the exposure head main body part 35. The controller 10a supplies color data corresponding to the scanning position of the head main body 35 to the exposure head main body part 35 on the basis of the positional information of the head main body 35 and image information data (position and color data) from the image information processor 90 so that the light source 41 of relevant colors in the first line of the head main body 35 emits light of the color (with a prescribed intensity, as desired) to form a latent image of the prescribed color on a prescribed position (dot area) in the scanning direction of the printing sheet 1. These operations are continuously carried out until the exposure head main body 35 completes a scanning operation in one direction (a forward scanning movement or a return scanning movement) from its initial position. When the exposure head main body part 35 completes the scanning operation in one direction, the pressing and developing head main body 59 is located outside the protruding area M of the platen main body 63, so that the pressing and developing part 50 permits the printing sheet 1 to be fed. When the scanning movements of the head main body parts 35 and 59 are temporarily stopped, the sheet 1 is fed by one pitch (one line of the dot area) in the direction A1 by the sheet feeding mechanisms 23 and 24. When the feed of the sheet 1 is completed, the scanning movements of the head main body parts 35 and 59 similar to those described above are carried out. At this time, the light sources of relevant colors in the first and second lines of the light sources 41 of the exposure head main body part 35 emit lights of the colors to carry out the scanning operation. When the second exposing and scanning processes for the first line of the sheet 1 and the first exposing and scanning processes for the second line are completed, the sheet 1 is fed by one pitch like the last time. After that, the light sources of relevant colors in the first to third lines of the light sources 41 of the exposing head main body 35 emit lights of the colors to carry out the scanning operation. When the third exposing and scanning processes for the first line of the sheet 1, the second exposing and scanning processes for the second line and the third exposing and scanning processes for the third line are completed, the sheet 1 is further conveyed by one pitch. Then, similar exposing and scanning processes to those described above are repeated. When the area of the sheet 1 to be exposed (a latent image forming area) reaches the pressing and developing head main body part 59, a development that the microcapsules corresponding to the latent image collapse to color to prescribed colors proceeds at the same time upon pressing, developing and scanning operations by the pressing and developing head main body 59. In this case, the pressing, developing and scanning operations by the pressing and developing head main body part 59 may be started when the area to be exposed reaches the pressing and developing head 59.

At the time of the exposing and scanning processes and the pressing, developing and scanning processes as described above, the exposure head main body part 35 can be supported by the frame 14 through the exposure head guide shaft 31 while it is separated from the pressing and developing head main body part 59, and can be driven and moved independently of the pressing and developing head main body part 59 through the exposure head driving shaft 33. Therefore, a proper latent image can be formed by a proper exposing operation with no fear that the exposing operation is disturbed by the pressing and developing operations.

As long as a condition that a prescribed printing operation is carried out on the printing sheet 1 is satisfied, the driving of the exposure head driving shaft 33 and the pressing and developing head driving shaft 54 only depends on how the power transmitting mechanism is formed between the output shaft 71 of the motor 70 and the respective driving shafts 33 and 54. In other words, unlike the case in which the exposure head (main body part) and the pressing and developing head (main body part) are integrally incorporated in one carriage to support the pressing and developing force of the pressing and developing head by the carriage, the operations of the exposure head main body part 35 and the pressing and developing head main body part 59 can be independently controlled or controlled with a correlative relation so as to have a mutually desired relation. Thus, the exposing operation and the pressing and developing operation which are originally different in their requirements from each other can be respectively individually optimized and the influence of both operations (mutual interference) which may be a little generated can be cancelled as much as possible.

For instance, as shown in FIG. 2, the exposure head main body part 35 and the pressing and developing head main body part 59 can be always moved in opposite scanning directions. In the case of the first preferred embodiment, upon tuning to the feeding direction A1 of the sheet at a certain time (for example, an initial position), if the exposure head main body part 35 is located in the right end, the pressing and developing head main body part 59 will be located in the left end. When the scanning speed of the exposure head main body part 35 in the direction C1 is equal to that of the pressing and developing head main body part 59 in the direction C2, and the exposure head main body part 35 reaches the left end and is turned by the turn-back groove 34c, the pressing and developing head main body part 59 reaches the right end and is turned by the turn-back groove 55d. Further, when the scanning speed of the exposure head main body part 35 in the direction C2 is equal to that of the pressing and developing head main body part 59 in the direction C1 and the exposure head main body part 35 reaches the right end and is turned by the turn-back groove 34d, the pressing and developing head main body part 59 reaches the left end and is turned by the turn-back groove 55c. In order to operate the exposure head main body part 35 and the pressing and developing head main body 59 part in such a way that they move at the same scanning speed and have phases opposite to each other with respect to the scanning direction, the exposure head main body part 35 and the pressing and developing head main body 59 are initialized to positions with the opposite phases to each other with respect to the scanning direction. Further, the rotating speed of the exposure head driving shaft 33 (the transmission characteristic of the power transmitting mechanism from the output shaft 71 of the motor 70 to the exposure head driving shaft 33) and the scanning speed of the exposure head main body part 35 specified by the pitches of the spiral of the spiral groove 34 may correspond exactly to the rotating speed of the pressing and developing head driving shaft 54 (the transmission characteristic of the power transmitting mechanism from the output shaft 71 of the motor 70 to the pressing and developing head driving shaft 54) and the scanning speed of the pressing and developing head main body part 59 specified by the pitches of spiral of the spiral groove 55. As illustrated in FIG. 2, when both pitches are identical, the rotating speed may be equal. If the pitches are different from each other, the power transmission characteristics (for example, gear ratio of a gear train etc.) from the output shaft 71 of the motor to the driving shafts 33 and 54 may be changed so as to change the rotating speed depending on the difference in pitch.

In the example shown in FIG. 2, when one of the exposure head main body part 35 and the pressing and developing head main body part 59 moves or is turned in the scanning direction C1, the other moves or is turned in the scanning direction C2. Therefore, forces (reaction of the driving force) applied to the frame 14 of the printer 10 through the driving shafts 33 and 54 are always opposite to each other and have a similar variation characteristic. Thus, the forces are actually cancelled each other by taking the rigidity of the frame 14 into consideration.

Figure 5:
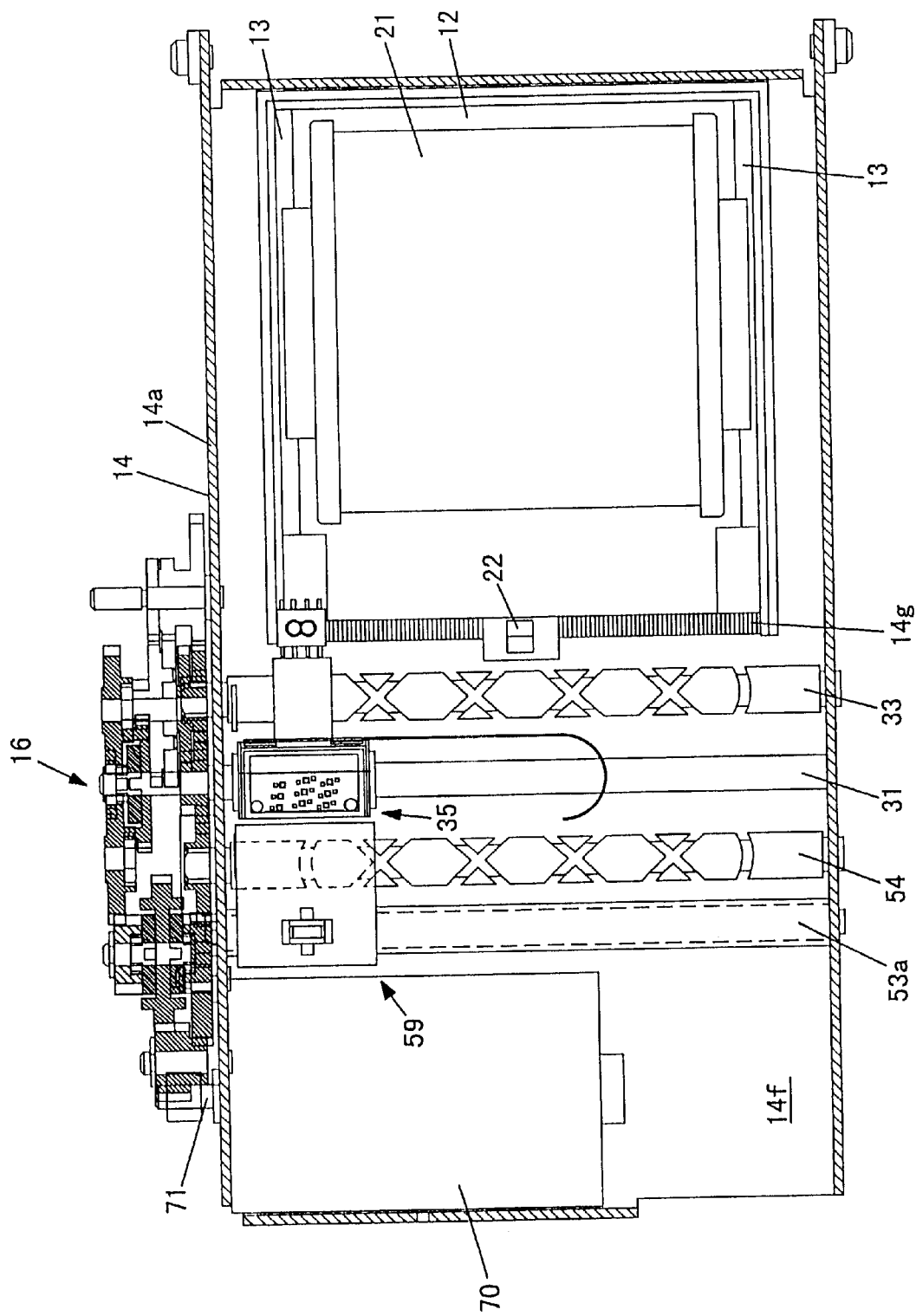
FIG. 5 is an explanatory view of an alternative example of the printer similar to that shown in FIG. 2.
Figure 6:
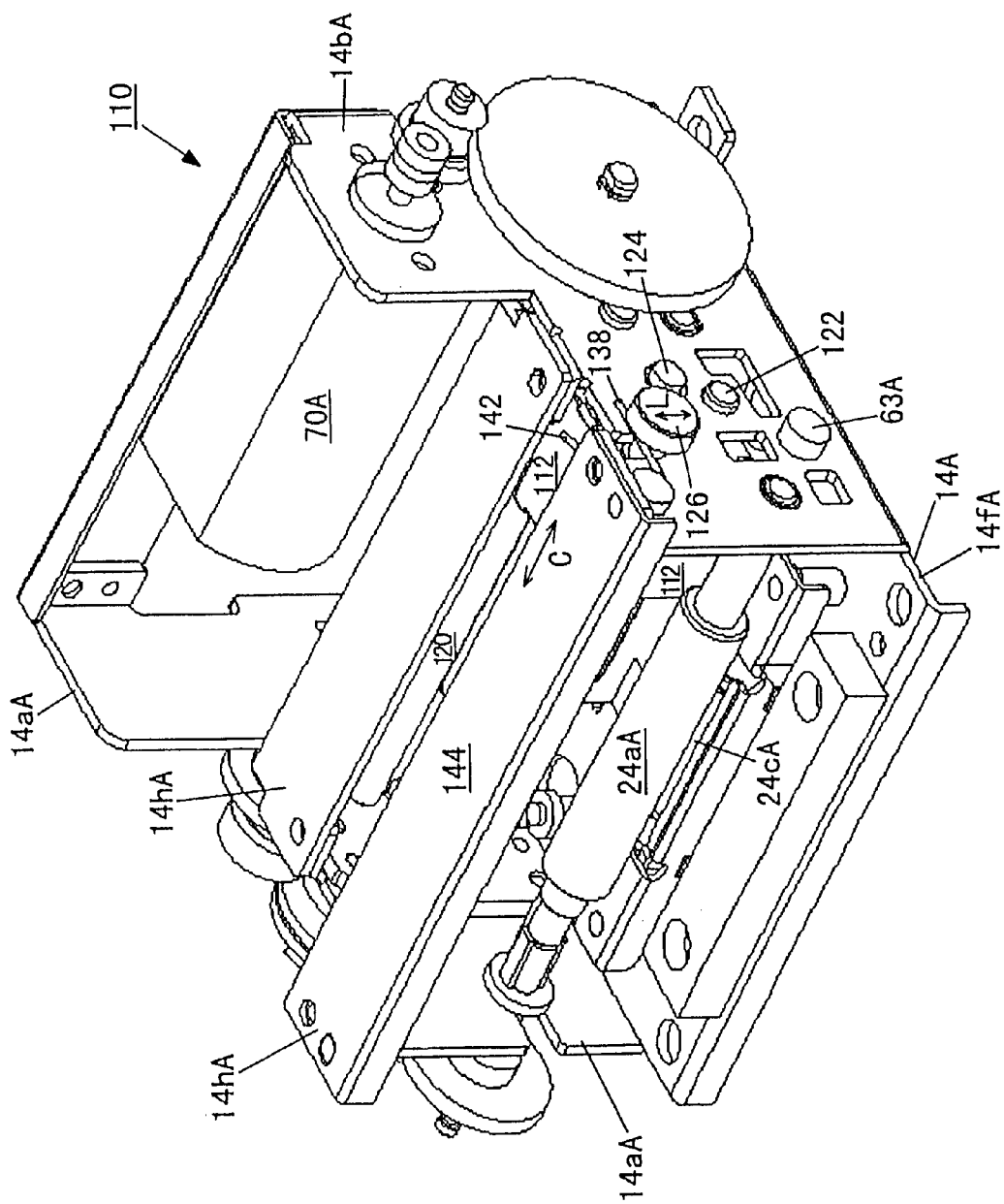
FIG. 6 is an explanatory perspective view of a printer showing one preferred embodiment according to a second aspect of the present invention, namely, a second embodiment, with a casing and a sheet feed part of the printer omitted.

If desired, as illustrated in FIG. 5, the two head main body parts 35 and 59 may be controlled so that the exposure head main body part 35 and the pressing and developing head main body part 59 are located at the same position (phase) at an arbitrary time in the scanning direction. For this purpose, the two head main bodies are controlled in the same manner as that of the example shown in FIG. 2, with the exception that the two head main body parts 35 and 59 are set to be located at the same position (phase) in the scanning direction when they are located at their initial positions.

Further, it should be noted that the number of times of exposing operations conducted by the exposure head main body part 35 may be different from the number of times of pressing, developing and scanning operations conducted by the pressing and developing head main body part 59 relative to the area of one line in the printing sheet 1 to be exposed by scanning. In this case, at least one of the rotating speed of the exposure head driving shaft 33 and the pitch of the spiral of the spiral groove 34 may be different from at least one of the rotating speed of the pressing and developing head driving shaft 54 and the pitch of the spiral of the spiral groove 55. For instance, if at least one of the rotating speed of the exposure head driving shaft 33 and the pitch of the spiral of the spiral groove 34 is larger than at least one of the rotating speed of the pressing and developing head driving shaft 54 and the pitch of the spiral of the spiral groove 55, the number of times of exposing operations for one line may be more than that of pressing, developing and scanning operations, on the contrary, the number of times of pressing, developing and scanning operations for one line may be more than that of exposing operations (for example, each time the exposure head main body part 35 is moved once either in the scanning direction C1 or C2, the pressing and developing head main body part 59 may be moved forward and returned both in the scanning directions C1 and C2. In the case of the former, a current feed level can be lowered for driving the LEDs 41 of the exposure head main body part 35 to emit lights or the number of lines of the LEDs 41 can be reduced. In the case of the latter, the pressing force exerted on the pressing and developing rollers 57 and 58 can be decreased, hence the rigidity of the support structure 56 can be reduced and accordingly, the compact printer 10 can be realized.

Further, when the sheet detecting sensor 22 detects that the trailing edge of the printing sheet 1 passes, it is immediately considered that the sheet 1 is not actually present in the exposure head main body part 35, or after the prescribed number of times of intermittent feed corresponding to the distance between the sensor 22 and the exposure head main body part 35 or the upstream sheet feeding mechanism 23, the exposure head main body part 35 may stop from being driven to move in the scanning direction or the LEDs 41 may stop from being driven to emit lights. As a consequence, the consumption power of the printer 10 can be reduced.

Still further, after the exposing operation of the printer 10 is started by holding the leading edge of the sheet 1 by the downstream sheet feeding mechanism 24, or after the prescribed number of intermittent feed corresponding to the distance between the downstream sheet feeding mechanism 24 or the exposure head main body part 35 and the pressing and developing head main body part 59, the driving of the pressing and developing head main body part 59 may be started. In the case of the former, this indicates that the leading edge of the sheet 1 reaches the pressing and developing head main body part 59. In the case of the latter, this corresponds to the case that a part of the sheet 1 on which a latent image is formed first reaches the pressing and developing head main body part 59. If desired, a sheet sensor which can detect the sheet just before the introduction of the sheet 1 to the pressing and developing part 50 may be separately provided the pressing and developing part 50 on the upstream side and the sheet feeding mechanism 24 on the downstream side. Also in these cases, wasteful pressing and scanning operations can be avoided.

In the above described embodiment, although the exposure head (main body part) 35 and the pressing and developing head (main body part) 59 are respectively driven in the scanning direction by the driving shafts 33 and 54 provided with the spiral grooves on their peripheral surfaces, it should be noted that the structures thereof may be formed in other configurations or may be different from each other as long as the exposure head (main body part) 35 and the pressing and developing head (main body part) 59 are independently supported by the frame 14 and can be independently moved in the scanning direction.

Now, one preferred embodiment of a printer according to a second aspect of the present invention, namely, a second preferred embodiment will be described hereinbelow with reference to FIGS. 6–13. In the printer 110 according to the second embodiment, the same or similar members or elements. to those of the printer 10 according to the above described first embodiment are designated by the same reference numerals with A affixed thereto. The parts of the printer 110 which are not described or shown in the drawings are constructed substantially similarly to those described in the printer 10 as much as applicable. In this case, as desired, a variation corresponding to the structural difference between the printer 110 and the printer 10 may be added to the printer 110.

In the printer 110, a sheet 1A is composed of a roll 21A housed in a sheet housing part 12A mounted on one end wall side 102 of a frame 14A. When the sheet 1A passes the printer 110 along a feed path shown by imaginary lines in FIG. 9, the sheet 1A is printed.

In the printer 110, an exposure head 35A and a pressing and developing head 59A are housed in a common carriage 112. The exposure head 35A has a structure similar to that of the exposure head 35 except that the exposure head 35A is directed downward. The pressing and developing head 59A comprises two rollers 57A and 58A similarly to the pressing and developing head 59 and constructed like the pressing and developing head 59 except that the roller 57A to which the sheet 1A is pressed is provided on the lower side. More specifically, the common carriage 112 has a roller housing chamber or a through hole 56cA in which the main bodies 57aA and 58aA of the rollers 57A and 58A of the pressing and developing head 59A are housed so as to be movable in a direction L with their peripheral surfaces coming into contact with each other and groove parts 56dA and 56eA in which shaft parts 57bA, 57cA, 58bA and 58cA at both ends of the roller main bodies 57aA and 58aA are housed so as to be movable in the direction L.

Figure 13:
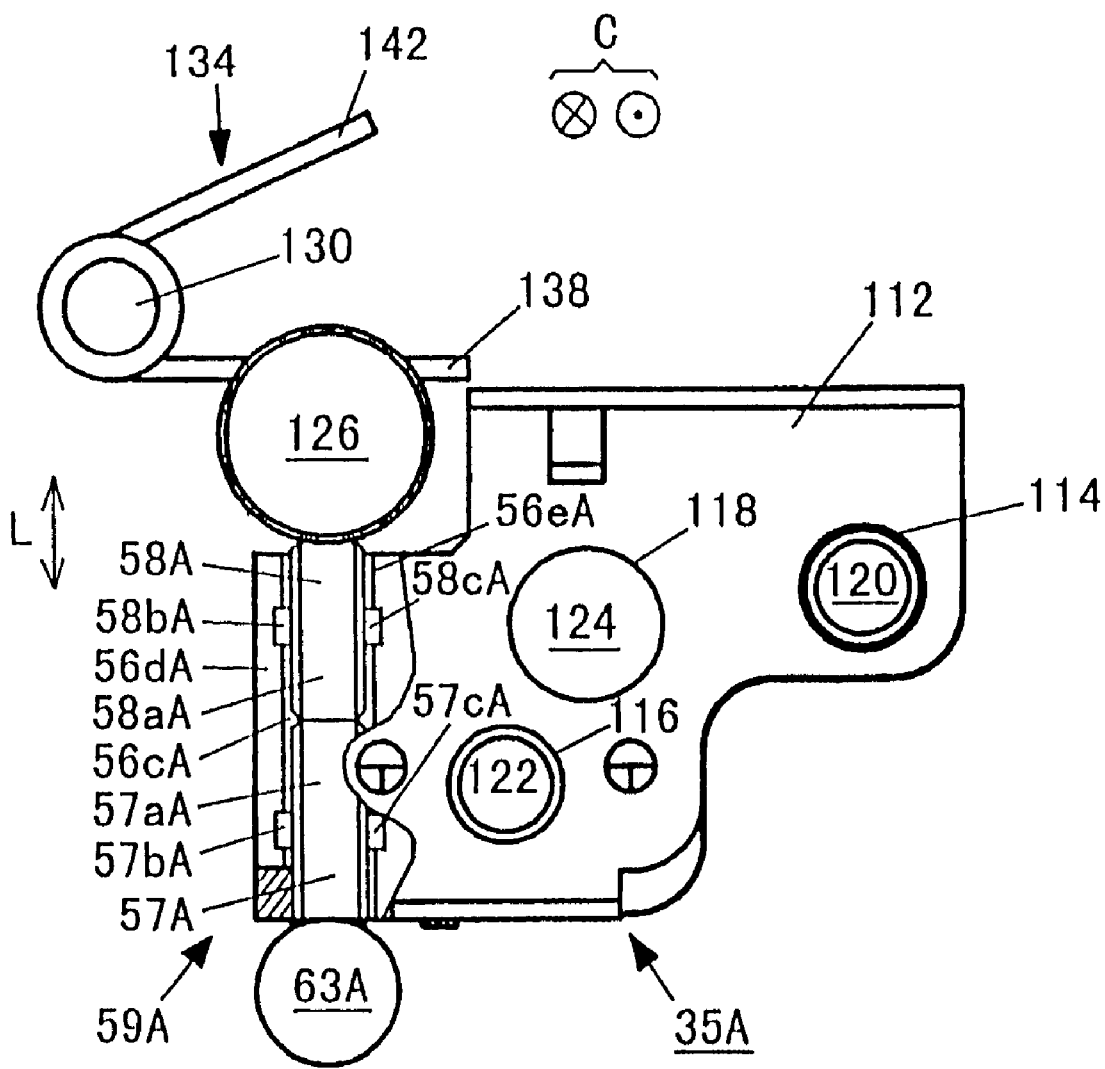
FIG. 13 is an explanatory side view of the parts shown in FIG. 10 in the printer shown in FIG. 6.

The common carriage 112 is provided with first and second guide shaft through holes 114 and 116 and a driving shaft through hole 118 (see FIG. 13). The first and second guide shaft through holes 114 and 116 are located above and below and at both sides in the horizontal direction of the driving shaft through hole 118. The second guide shaft through hole 116 is located between the pressing and developing head 59A and the driving shaft through hole 118 viewing in the horizontal direction. In this instance, one guide shaft through hole may be provided, however, it is preferable to provide two guide shaft through holes in such a relative arrangement as shown with respect to the driving shaft through hole 118 and the pressing and developing head 59A in order to stably support the carriage 112. First and second carriage guide shafts 120 and 122 extending between the side walls 14aA and 14bA of the frame 14 of the printer 110 pass through the guide shaft through holes 114 and 116 in a scanning direction C to support the common carriage 112 so as to be slidable in the scanning direction C. A carriage driving shaft 124 similar to the driving shafts 33 and 54 passed through the driving shaft through hole 118 of the carriage 112 and is rotatably supported between the side walls 14aA and 14bA of the frame 14A (the detail of a supporting mechanism is not shown). A pin 127 similar to the pins 38 and 60 is engaged with the spiral groove 125 of the carriage driving shaft 124 (see FIG. 9). When the carriage driving shaft 124 is rotated in one direction, the carriage 112 is moved in a reciprocating manner in the direction C through the engagement of the groove 125 and the pin 127. For this purpose, the spiral grooves 125 is provided with clockwise and counterclockwise groove parts and turn-back groove parts at both ends like, for instance, the groove parts 34a, 34b, 34c and 34d.

On the upper roller main body 58aA of the roller bodies 58aA and 57aA stacked in the chamber 56cA, a cylindrical pressure bar, namely, a pressing (pushing) bar or rod 126 serving as a pressing and developing head support base is mounted. The pressure bar 126 is pressed to the sheet 1A side by one end or one arm parts 136 and 138 of short coil shaped torsion springs 132 and 134 as elastic biasing means in small diameter parts 126a and 126b protruding outward in the direction C from the side walls 14aA and 14bA of the frame 14A. The coil shaped torsion springs 132 and 134 are fitted or freely fitted to protrusions 128 and 130 protruding outward from the side walls 14aA and 14bA in their annular central parts. The other end or the other arm parts 140 and 142 of the springs 132 and 134 are supported by a spring pressing part 144 forming a part of the top wall 14hA of the frame 14A. As long as the pressure bar as the pressing and developing head support base is supported by a part of the rigid frame 14A, the configuration or structure of the pressure bar and the elastic biasing means for pressing the pressure bar to the roller main bodies may be different from those of the illustrated form.

A developing support base (sheet support base) 51A serving as a sheet supporting means located on the back surface 1aA side of the sheet 1A is composed of a substantially cylindrical platen 63A supported by the frame 14A of the printer 110. The platen 63 has such a length (sufficiently larger than the width of the sheet 1A) as to separate the roller 57A of the pressing and developing head 59A from the side edge of the sheet 1A, for instance, when the pressing and developing head 59A reaches an end part in the scanning direction. The platen 63A may be rotatable about its central axis or may be fixed to the frame 14A. When the platen 63A is fixed to the frame 14A, the platen 63 A may be formed in any other arbitrary shapes in cross-section in place of a circular shape, as long as its upper edge part extends linearly in the direction C.

Figure 7:
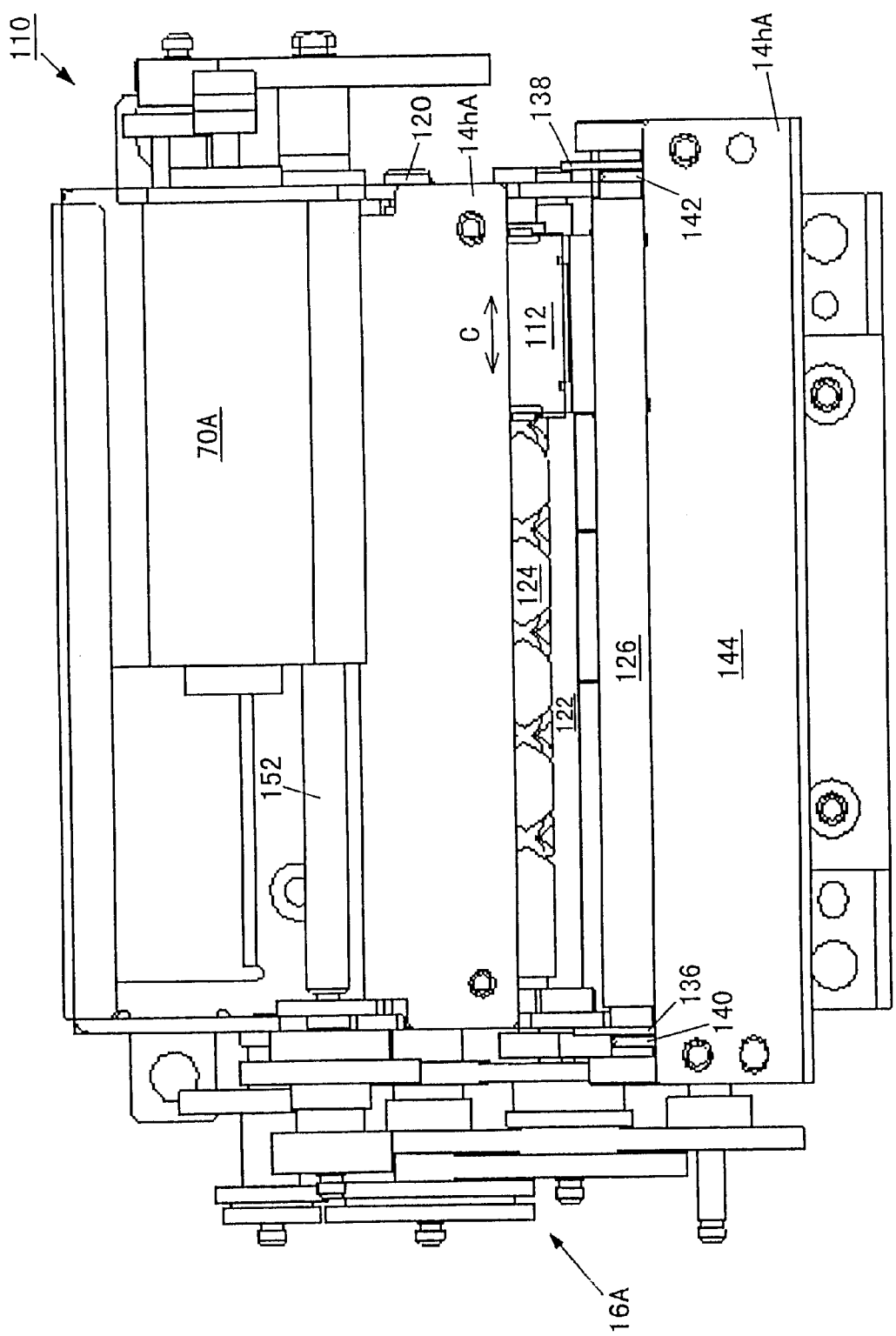
FIG. 7 is an explanatory plan view of the printer shown in FIG. 6 in a similar state to that of FIG. 6.
Figure 8:
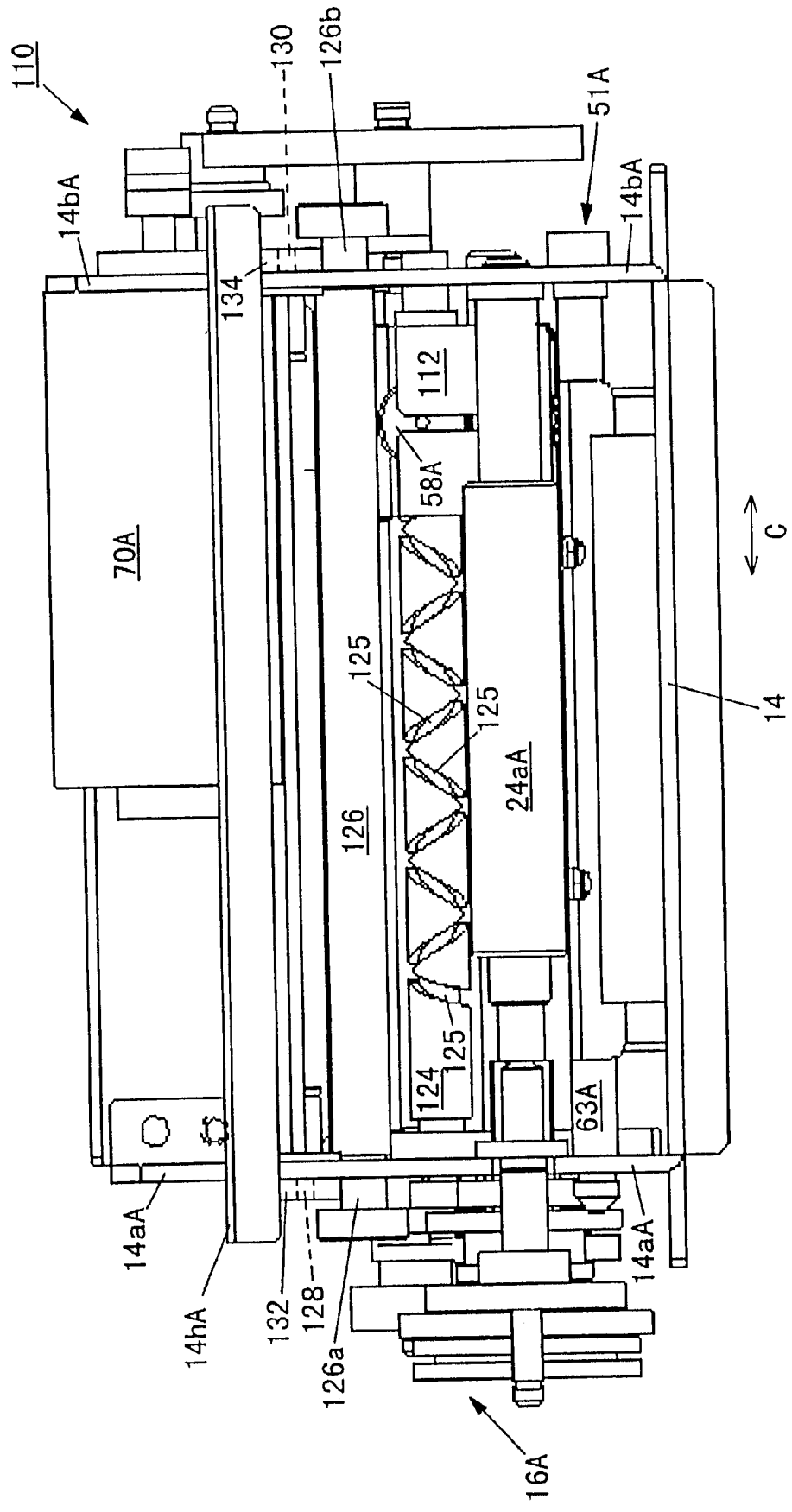
FIG. 8 is an explanatory front view of the printer shown in FIG. 6 in a similar state thereto.
Figure 9:
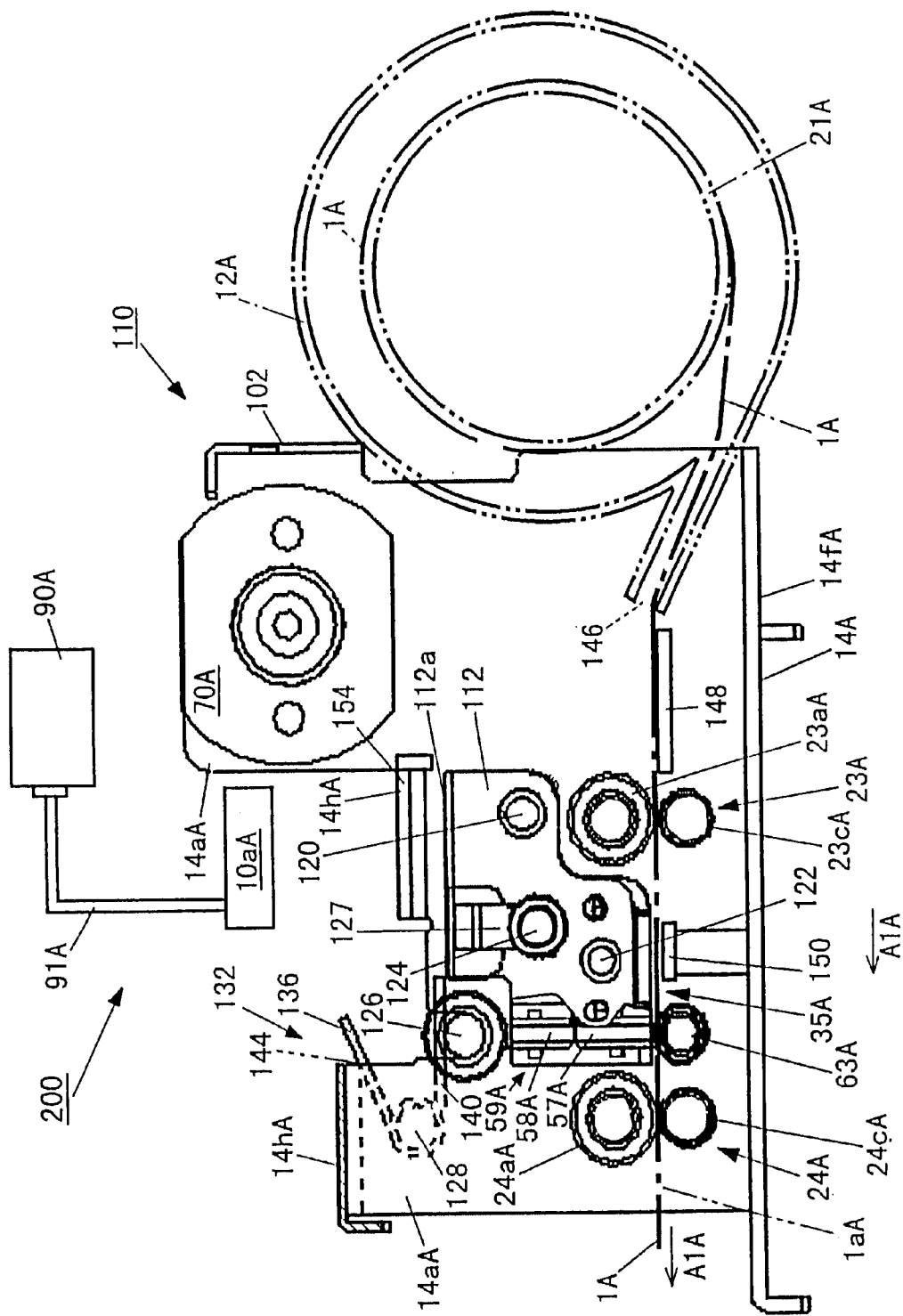
FIG. 9 is an explanatory side view of the printer shown in FIG. 6 in a similar state thereto with a front side wall omitted.
Figure 10:
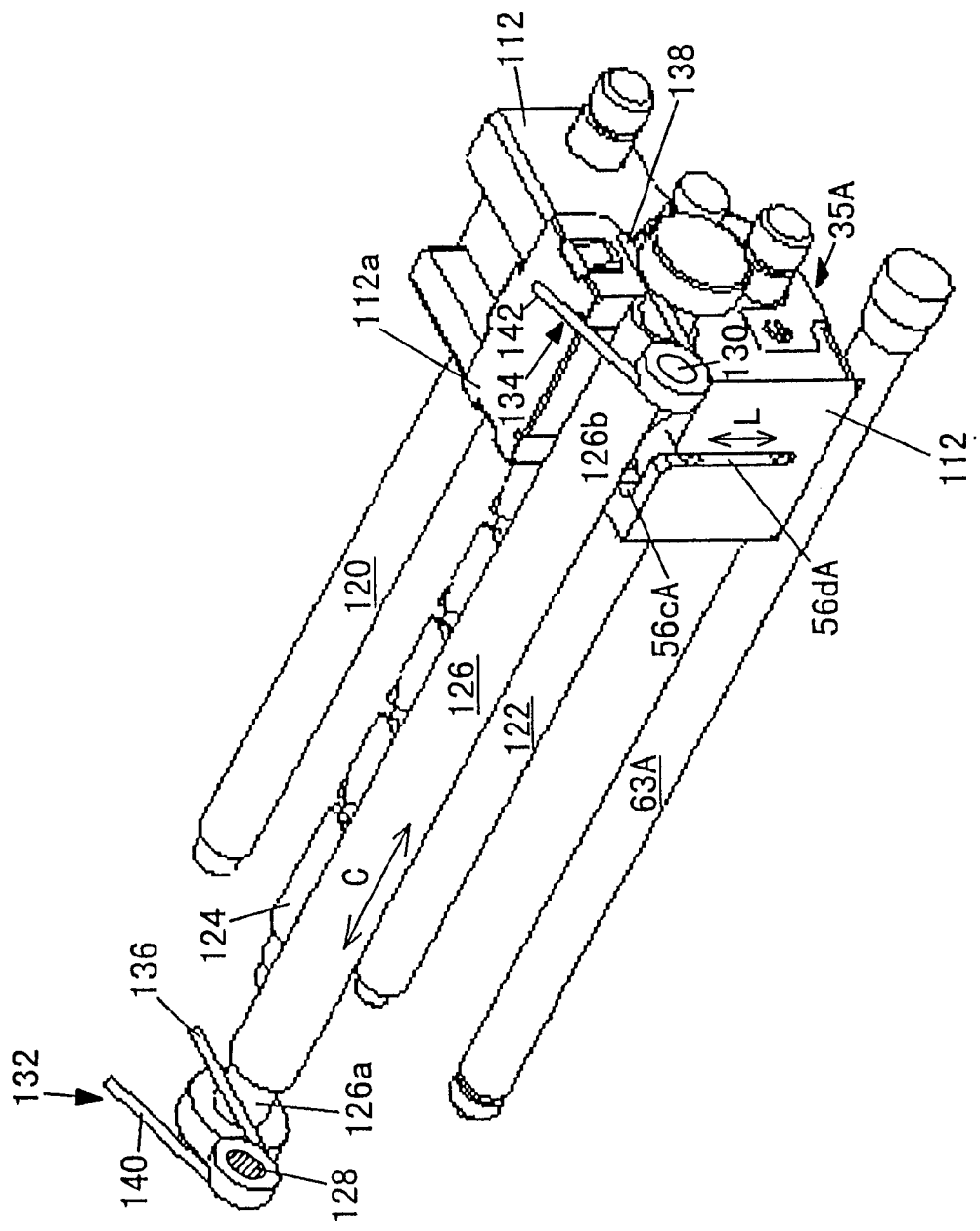
FIG. 10 is an explanatory perspective view of a carriage and shafts associated therewith of the printer shown in FIG. 6.
Figure 11:
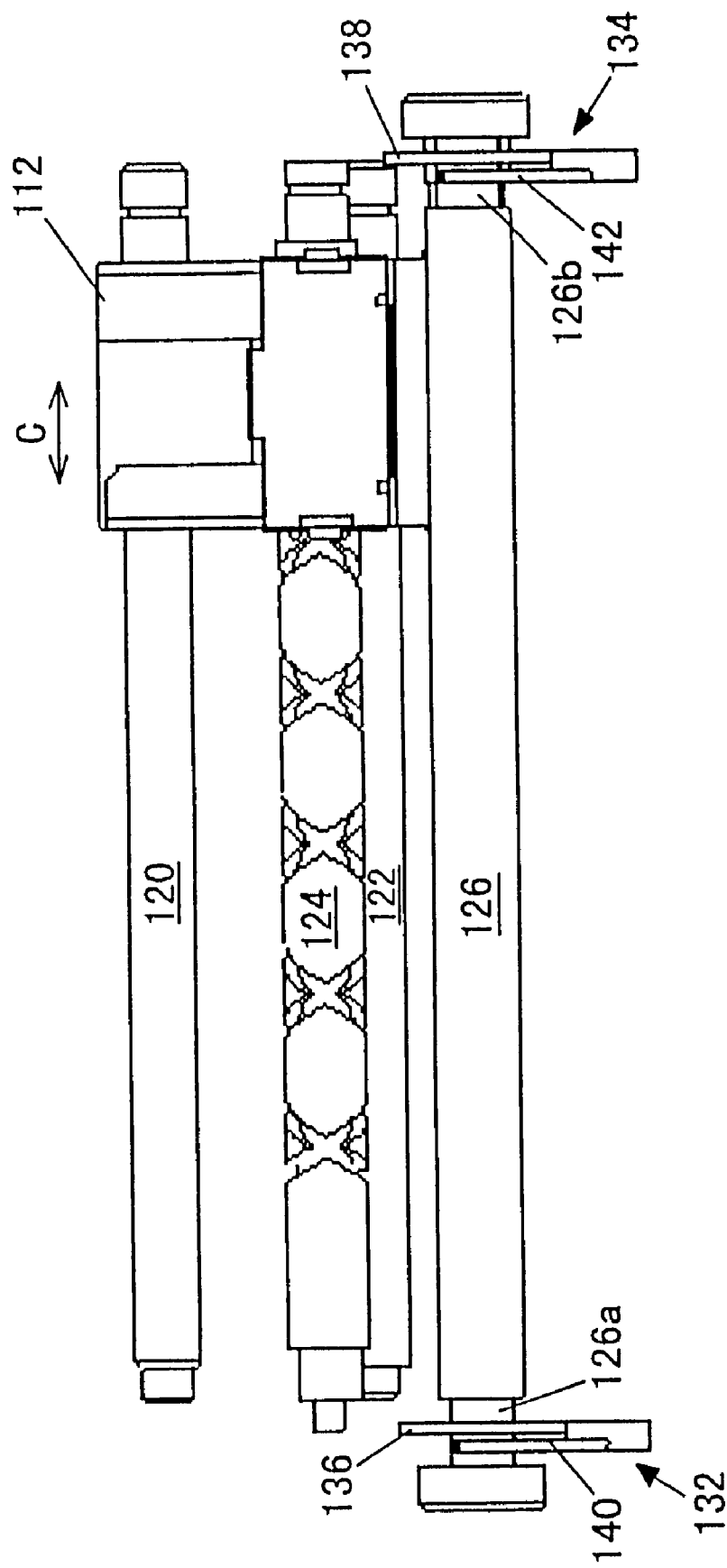
FIG. 11 is an explanatory plan view of the parts shown in FIG. 10 in the printer shown in FIG. 6.
Figure 12:
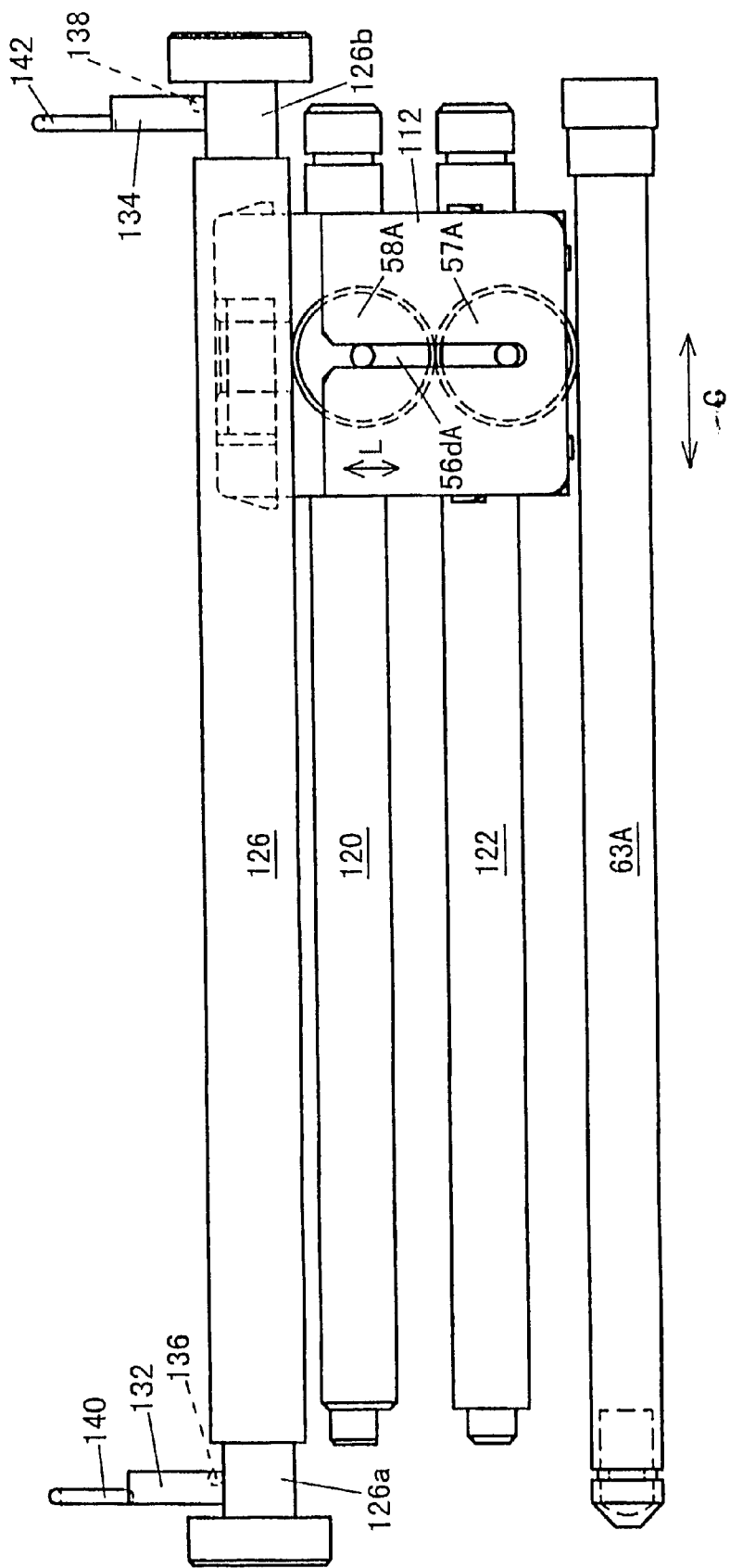
FIG. 12 is an explanatory front view of the parts shown in FIG. 10 in the printer shown in FIG. 6.

FIG. 9 is a side view with the side wall 14bA omitted, In FIG. 9, 12A designates a part for housing the sheet 1A in the form of the roll 21A. The sheet 1A supplied form the opening 146 of the sheet housing part 12A is fed to an upstream sheet feeding mechanism 23A through a horizontal guide base 148. In this embodiment as illustrated, although the sheet housing part 12A is disposed so as to print images on the roll shaped sheet 1A having a photoconductive layer formed on its inner surface, it should be noted that the sheet housing part 12A may be configured and arranged so as to print images on the roll shaped sheet 1A having a photoconductive layer formed on its outer surface. The upstream sheet feeding mechanism 23A comprises a pair of rollers 23aA and 23cA located on the upstream side of the carriage 112 with respect to a sheet feeding direction A1A. A downstream sheet feeding mechanism 24A comprises of a pair of rollers 24aA and 24cA located on the downstream side of the carriage 112. When the pressing and developing head 59A is located at the end position in the scanning direction C in which the holding state of the sheet 1A is substantially released, the upstream and downstream sheet feeding mechanisms 23A and 24A cooperate with each other to feed the sheet 1A horizontally in the direction A1A along the front surfaces of the exposure head 35A and the pressing and developing head 59A housed in the carriage 112. A reference numeral 150 designates a sheet support base for supporting the sheet 1A in the front face of the exposure head 35A. In this case, the base 150 may not be provided. In FIG. 7, a reference numeral 152 designates a transmitting shaft for transmitting a rotating and driving force from the output shaft of a motor 70A to a power transmitting mechanism 16A composed of a gear mechanism or the like.

Since the operations of the printer 110 and a printing system 200 having the printer 110 are really the same as those of the above described printer 10 and the printing system 100 except that the exposure head 35A and the pressing and developing head 59A are housed in the common carriage 112 (in other words, the pressing and developing head 59A is housed in the common carriage 112 as the exposure head 35A), the exposure head 35A and the pressing and developing head 59A are simultaneously moved in the scanning direction C upon movement of the carriage 112 in the scanning direction C and the downstream sheet feeding mechanism 24A is located on the downstream side of the pressing and developing head 59A, an entire explanation thereof or the like will be omitted and operations associated with the pressing and developing head 59A are only described below.

In the printer 110, since the pressing and developing head 59A composed of a pair of rollers 57A and 58A is held between the pressure bar 126 and the platen 63A located in the back of the sheet 1A, when the carriage 112 is moved in the scanning direction C while the latent image forming part of the sheet 1A is held between the roller 57A of the pressing and developing head 59A and the platen 63A, the roller 57A rolls in the direction C on the sheet 1A supported by the platen 63A and the roller 58A rolls in the direction C along the surface of the pressure bar 126. Since the elastic biasing force directed toward the platen 63A is exerted on the pressure bar 126 by the springs 132 and 134 supported on the side walls 14aA and 14bA and the top wall part 14hA, the roller 57A moves on the sheet 1A in the scanning direction C upon rolling while it applies the pressing force to the sheet 1A on the platen 63 A at its point contact part with the sheet 1A to press and develop the latent image forming part (exposed part). Since the platen 63A is also directly supported at both ends thereof by the frame side walls 14aA and 14bA, the pressing force exerted on the pressed and developed part of the sheet 1A is directly supported by the frame 14 itself. Thus, the pressing force in a direction L is not actually applied to the carriage 112. Therefore, upon developing and scanning operations carried out simultaneously with the pressing and developing operations (scanning), there is very little fear that the positional relation between the exposure head 35A and the sheet 1A varies, and the exposure head 35A can expose the prescribed part of the sheet 1A as desired. Further, a force accompanied by the pressing and developing operations is not practically applied to the guide shafts 120 and 122 of the carriage 112, so that the carriage 112 is supported and guided by the guide shafts 120 and 122 with no adverse effects of the guide shafts. Further, there is very little fear that the peripheral surfaces of the guide shaft through holes 116 and 118 of the carriage 112 or the peripheral surfaces of the guideshafts 120 and 122 are worn due to the influence of the pressing force. As a result, a positional accuracy in guiding the heads 35A and 59A in the scanning direction is hardly deteriorated due to the carriage 12.

Still further, in the printer 110, since the platen 63A is directly supported at both ends thereof by the frame side walls 14aA and 14bA, the support line of the sheet 1A specified by the upper end edge of the peripheral surface of the platen 63A can be always practically held in a prescribed position (in this embodiment, actually held in a horizontal position). As compared the support of the sheet 1A in the printer 110 with that of a structure (case) for supporting the platen by the frame through an elastic member as employed in the conventional printer of this type, in the case of the latter, there is a fear that the orientation of the platen varies as the position of the pressing and developing head in the scanning direction changes, so that the sheet may be possibly distorted so as to be rotated about the axis in a sheet feeding direction. In the case of the printer 110, however, there is no fear that the sheet is distorted as mentioned above, but the pressing force can be actually applied always and substantially vertically to the surface of the sheet 1A. The printer 10 shown in FIGS. 1 to 5 also has the same advantages as described above. Here, to "directly" support the platen by the frame not only implies that the platen is supported by the frame itself, but also implies that the platen is supported through a substantially rigid separate member which is attached to the frame so as to be immovable in the pressing direction L.

Still further, in the printer 110, upon its assembly, the platen 63A is fitted and inserted between the side walls 14aA and 14bA of the frame 14A and the carriage 112 is fitted to the shafts 120, 122 and 124. Then, the roller 57A and the roller 58A are housed in the roller housing chamber 56cA of the carriage 112 successively from its upper part with a prescribed orientation. Then, the pressure bar 126 is fitted and inserted between the side walls 14aA and 14bA so as to be mounted on the roller 58A. After that, the springs 132 and 134 are attached to the side walls 14aA and 14bA so as to press down the pressure bar 126 in the direction L. In such a manner, the pressing and developing roller parts can be assembled, so that the assembly thereof can be carried out with ease. Upon disassembly of the pressing and developing roller parts, the above described assembly procedure may be reversely performed, and accordingly, the disassembly thereof can be also carried out with ease.

In the case of the conventional printer with loading or pressing springs provided below the platen, when the carriage with the pressing and developing head housed integrally therein is attached to the frame, not only it is uneasy to hold stably the platen and the support springs thereof in their positioned states, but also it is necessary to remove the carriage and the platen from the frame under a spring loaded state upon disassembly of the pressing and developing head parts and it is troublesome to disassemble the pressing and developing head parts without breaking associated parts or other parts nor scattering the springs. However, in this printer 110, the pressing and developing head parts can be easily assembled and disassembled without a fear of breaking the associated parts or other parts and scattering the springs.

Still further, in the printer 110 according to the second embodiment, since the platen 63A is attached between the side walls 14aA and 14bA so as to be immovable in the vertical direction L, and when the carriage 112 reaches at least one end in the scanning direction, the supply of sheet 1A is permitted. Therefore, the printer 110 according to the second embodiment of the present invention is different from the conventional printer of a type that the position of the platen is adjusted by a cam to permit the feed of the sheet. According to the printer 110, not only it is unnecessary to adjust the position of the platen by the cam depending on the position of the carriage in the scanning direction, but also it is unnecessary to set the angular position (positional adjustment) of the cam such as acquisition of the position of the platen depending on the position of the carriage. In place of increasing the length of the platen 63A, as in the case of the platen 63 of the printer 10, the edge parts of the platen 63A opposed to the pressing and developing rollers in the end parts of the scanning direction C may be tapered toward the end parts in the scanning direction C so as to evade or be separate from the pressing and developing rollers so that, when the pressing and developing head reaches the tapered end parts of the platen 63A, the feed of the sheet 1A can be permitted in the feeding direction A1A. Further, at least one of the springs 132 and 134 may apply pressure to the pressure bar 126 in the direction L in the vicinity of the side wall 14aA or 14bA and inside the side wall 14aA or 14bA, so that the roller 58A forming the pressing and developing head 59A can be moved in the scanning direction C outside the spring 132 or 134 located inside its associated side wall to permit the sheet 1A to be fed when the pushing force of the spring decreases.

Furthermore, in the printer 110, since a position sensor or an encoder similar to the exposure head position sensor or the encoder 37, which is not shown, is provided on, for example, the upper surface 112a (see FIG. 9 or 10) of the carriage 112 integral with the exposure head 35A to read the scale marks of a scale similar to the above described scale 14g formed on the frame top wall part 154 (see FIG. 9) facing the upper surface 112a, to detect the position of the exposure head 35A in the scanning direction C under the control of a controller 10aA and to control the position of the exposure head 35A or the carriage 112 in the scanning direction C through the driving shaft 124, the positional control of the exposure head 35A or the like is carried out in the same way as that of the printer 10. Besides, in the printer 110, a sheet position sensor (not shown) for detecting the leading edge or the trailing edge of the sheet 1A in the sheet feeding direction A1A may be provided as desired as in the case of the printer 10, and therefore, the integral positional control of the exposure head 35A and the pressing and developing head 59A can be carried out in the scanning direction C as well as the control of feed of the sheet 1A by the sheet feeding mechanisms 23A and 24A on the basis of the position of the sheet 1A in the sheet feeding direction A1A.

What is claimed is:

1. A printer for intermittently feeding printing sheets to which a photoconductive microcapsule is applied in a sheet feeding direction and printing images on the printing sheets, said printer comprising:

a frame;

an exposure head which is supported by the frame and irradiates light to the sheets to form a latent image thereon; and a pressing and developing head which is supported by the frame so as to reciprocate in a scanning direction intersecting the sheet feeding direction on the downstream side of the exposure head with respect to the sheet feeding direction and applies pressure to the latent image forming part of the sheet in cooperation with a sheet supporting means to develop a latent image, wherein said pressing and developing head being supported by a support base supported on a frame main body and extending in the scanning direction of the sheet independently of the exposure head so as to apply a pressing and developing force to the sheet and being capable of reciprocating in the scanning direction on said support base.

2. A printer according to claim 1, further comprising a biasing means for biasing at least one of the support base and the sheet supporting means to the other so that the pressing and developing head supported by the support base applies pressure to the latent image forming part of the sheet in cooperation with the sheet supporting means to develop the latent image when the pressing and developing head is moved in the scanning direction of the sheet on the support base.

3. A printer according to claim 1, further comprising a pressing and developing head driving means for moving the pressing and developing head in a reciprocating manner relative to the frame independently of the exposure head.

4. A printer according to claim 3, wherein said pressing and developing head has pressing rollers rolling and pressing onto the printing sheet supported by the sheet supporting means.

5. A printer according to claim 3, wherein said exposure head is supported by the frame so as to reciprocate in the scanning direction of the sheet and is further provided with an exposure head driving means for reciprocating the exposure head relative to the frame.

6. A printer according to claim 5, wherein the number of times of exposing operations by the exposure head is different from that of pressing, developing and scanning operations by the pressing and developing head relative to an area of one line exposed by scanning the printing sheet.

7. A printer according to claim 6, wherein the number of times of exposing operations for one line is more than that of pressing, developing and scanning operations.

8. A printer according to claim 6, wherein the number of times of pressing, developing and scanning operations for one line is more than that of exposing operations.

9. A printer according to claim 5, wherein the scanning direction of the exposure head is reverse to that of the pressing and developing head at least in one scanning operation.

10. A printer according to claim 3, wherein the pressing and developing head begins to be driven after the leading edge of the printing sheet reaches the pressing and developing head.

11. A printer according to claim 5, wherein the exposure head is driven only when the printing sheet is located in the front surface of the exposure head.

12. A printer according to claim 3, wherein a sheet feeding mechanism which feeds the sheet by holding the substantially widthwise entire area of the sheet therebetween is provided between the exposure head and the pressing and developing head with respect to the sheet feeding direction.

13. A printer according to claim 2, wherein the exposure head and the pressing and developing head are housed in a common carriage and said carriage is supported by the frame so as to reciprocate in the scanning direction.

14. A printer according to claim 13, wherein the sheet supporting means is substantially immovable relative to the frame main body and the biasing means is constituted to apply a force on the support base for biasing the support base toward the sheet supporting means.

15. A printer according to claim 13, wherein the biasing means is composed of an elastic supporting means.

16. A printer according to claim 13, wherein the pressing and developing head has pressing rollers rolling in the scanning direction and pressing the printing sheet supported by the sheet supporting means.

17. A printer according to any one of claims 1 to 16, further comprising an image information processor for supplying image information to the exposure head.

* * * * *

UNITED STATES PATENT AND TRADEMARK OFFICE
CERTIFICATE OF CORRECTION

PATENT NO. : 6,266,135 B1
APPLICATION NO. : 09/440422
DATED : July 24, 2001
INVENTOR(S) : Hosoi et al.

It is certified that error appears in the above-identified patent and that said Letters Patent is hereby corrected as shown below:

On the title page insert --(30) Foreign Application Priority Data
November 17, 1998 [JP] Japan………10-327028
January 19, 1999 [JP] Japan ………11-010289--

Signed and Sealed this

Twenty-fifth Day of December, 2007

JON W. DUDAS
*Director of the United States Patent and Trademark Office*